(12) United States Patent
Guzenda

(10) Patent No.: US 11,301,514 B2
(45) Date of Patent: Apr. 12, 2022

(54) SYSTEM AND METHOD TO IDENTIFY ISLANDS OF NODES WITHIN A GRAPH DATABASE

(71) Applicant: Leon Guzenda, Rio Vista, CA (US)

(72) Inventor: Leon Guzenda, Rio Vista, CA (US)

(*) Notice: Subject to any disclaimer, the term of this patent is extended or adjusted under 35 U.S.C. 154(b) by 0 days.

(21) Appl. No.: 17/036,399

(22) Filed: Sep. 29, 2020

(65) Prior Publication Data

US 2021/0141835 A1  May 13, 2021

Related U.S. Application Data

(63) Continuation-in-part of application No. 13/783,233, filed on Mar. 2, 2013, now Pat. No. 10,789,294.

(51) Int. Cl.
| | |
|---|---|
| *G06F 16/901* | (2019.01) |
| *G06F 9/46* | (2006.01) |
| *G06F 16/9035* | (2019.01) |

(52) U.S. Cl.
CPC ......... *G06F 16/9024* (2019.01); *G06F 9/466* (2013.01); *G06F 16/9035* (2019.01)

(58) Field of Classification Search
CPC .. G06F 16/9024; G06F 9/466; G06F 16/9035; G06F 16/28
See application file for complete search history.

(56) References Cited

U.S. PATENT DOCUMENTS

| | | | |
|---|---|---|---|
| 5,504,885 | A | 4/1996 | Alashqur |
| 5,754,543 | A | 5/1998 | Seid |
| 5,893,108 | A | 4/1999 | Srinivasan et al. |
| 5,918,231 | A | 6/1999 | Yasumura |
| 5,926,463 | A | 7/1999 | Ahearn et al. |
| 6,003,036 | A | 12/1999 | Martin |
| 6,917,985 | B2 | 7/2005 | Madruga et al. |
| 6,961,310 | B2 | 11/2005 | Cain |
| 6,985,928 | B2 | 1/2006 | Zhang |

(Continued)

FOREIGN PATENT DOCUMENTS

JP    2009141425 A    6/2009

OTHER PUBLICATIONS

A novel community detection method based on whale optimization algorithm with evolutionary populationFeng Yunfei; Chen, Hongmei; Li Tianrui; Luo Chuan. Applied Intelligence 50.8: 2503-2522. Boston: Springer Nature B.V. (Aug. 2020) (Year: 2020).*

*Primary Examiner* — Michael Won
(74) *Attorney, Agent, or Firm* — Patrick Reilly

(57) ABSTRACT

The invented method includes one or more of the following aspects of selecting a multiplicity of nodes, deriving a designator for each node of the multiplicity of nodes and associating each designator in a one-to-one correspondence with a respective node from which a respective designator is derived, each designator indicating a plurality of dimensional values, and each dimensional value expressing a quality of a variate property of an associated node, selecting a unique designator having a particular pattern of dimensional values, selecting a first node having a first node designator matching the particular pattern of dimensional values, and when no node is found to have the particular pattern of dimensional values expressed in the respective designator to be connected by an edge to an external node, reporting a positive finding of an island.

20 Claims, 34 Drawing Sheets

(56) References Cited

U.S. PATENT DOCUMENTS

| | | |
|---|---|---|
| 7,633,940 B1 | 12/2009 | Singh |
| 7,739,402 B2 | 6/2010 | Roese |
| 7,754,543 B2 | 7/2010 | Soda |
| 7,860,895 B1 | 12/2010 | Scofield et al. |
| 7,945,559 B2 | 5/2011 | Hays |
| 8,117,187 B2 | 2/2012 | Mostl |
| 8,160,056 B2 | 4/2012 | Van der Merwe |
| 8,176,036 B2 | 5/2012 | Srivastava et al. |
| 8,285,859 B2 | 10/2012 | Boldyrev et al. |
| 8,291,114 B2 | 10/2012 | Mao |
| 8,543,681 B2 * | 9/2013 | Bearden ............... H04M 7/006 709/224 |
| 8,560,671 B1 | 10/2013 | Yahalom et al. |
| 8,626,749 B1 | 1/2014 | Trepetin |
| 8,874,356 B1 | 10/2014 | Bonawitz |
| 9,021,112 B2 | 4/2015 | Slocombe et al. |
| 9,021,113 B2 | 4/2015 | Carr et al. |
| 9,521,067 B2 | 12/2016 | Michael et al. |
| 9,924,313 B1 | 3/2018 | Akselrod |
| 9,945,559 B2 | 4/2018 | Beyrodt |
| 9,952,620 B2 | 4/2018 | Gutierrez |
| 10,360,760 B2 * | 7/2019 | Northrup ............... G08G 1/149 |
| 10,521,752 B1 | 12/2019 | Williamson |
| 10,789,294 B2 * | 9/2020 | Guzenda ............... H04L 45/02 |
| 2001/0047285 A1 | 11/2001 | Borders |
| 2002/0042274 A1 * | 4/2002 | Ades ................... H04L 41/0863 455/445 |
| 2003/0086425 A1 * | 5/2003 | Bearden ............... H04M 3/2236 370/392 |
| 2003/0130821 A1 | 7/2003 | Anslow et al. |
| 2003/0224384 A1 | 12/2003 | Sayood |
| 2004/0017783 A1 | 1/2004 | Szentesi |
| 2004/0024573 A1 * | 2/2004 | Allen ................... H04L 41/22 702/189 |
| 2004/0143676 A1 | 7/2004 | Baudry et al. |
| 2004/0143678 A1 | 7/2004 | Chari et al. |
| 2006/0149712 A1 | 7/2006 | Kindsvogel et al. |
| 2006/0182034 A1 | 8/2006 | Klinker et al. |
| 2006/0267961 A1 | 11/2006 | Onoda et al. |
| 2006/0287981 A1 | 12/2006 | Meyers et al. |
| 2007/0058631 A1 | 3/2007 | Mortier et al. |
| 2007/0106666 A1 | 5/2007 | Beckerle |
| 2008/0209046 A1 | 8/2008 | Karkanias et al. |
| 2009/0094085 A1 | 4/2009 | Kantarjiev |
| 2009/0292614 A1 | 11/2009 | Reichow et al. |
| 2009/0292814 A1 | 11/2009 | Ting et al. |
| 2010/0223240 A1 | 9/2010 | Cooper |
| 2011/0035673 A1 | 2/2011 | Chou et al. |
| 2011/0076168 A1 | 3/2011 | Irving et al. |
| 2011/0078188 A1 | 3/2011 | Li et al. |
| 2011/0116715 A1 | 5/2011 | Wang |
| 2011/0191200 A1 | 8/2011 | Bayer et al. |
| 2012/0197834 A1 | 8/2012 | Panigrahy et al. |
| 2012/0227066 A1 | 9/2012 | Woxblom et al. |
| 2012/0227086 A1 | 9/2012 | Dale et al. |
| 2013/0110766 A1 | 5/2013 | Promhouse |
| 2013/0226971 A1 | 8/2013 | Shoolman |
| 2013/0238815 A1 * | 9/2013 | Ogawa ................... H04L 29/08 709/244 |
| 2013/0282806 A1 | 10/2013 | Steinberg et al. |
| 2013/0318228 A1 | 11/2013 | Raja et al. |
| 2013/0325847 A1 * | 12/2013 | Suchter ............... G06F 16/951 707/722 |
| 2014/0074893 A1 | 3/2014 | Griffin |
| 2014/0122585 A1 | 5/2014 | Delong |
| 2015/0012320 A1 | 1/2015 | Juckett |
| 2015/0188767 A1 | 7/2015 | Li |
| 2016/0080975 A1 * | 3/2016 | Callard ............ H04W 72/0426 370/235 |
| 2016/0171055 A1 | 6/2016 | Erickson |

\* cited by examiner

| NR.ID.01 | N.ID.01 | N.TYPE.01 | N.ID.02 | E.ID.61 | E.TYPE.61 | N.ID.03 | E.ID.63 |
|---|---|---|---|---|---|---|---|
| E.TYPE.63 | N.ID.05 | E.ID.65 | E.TYPE.65 | N.ID.06 | E.ID.66 | E.TYPE.66 | NR.HIST.01 |

FIRST NODE RECORD NR.01 · FIRST EDGE RECORD ER.01

FIGURE 4A

| ER.ID.61 | E.ID.61 | E.TYPE.61 | N.ID.01 | NID.02 |
|---|---|---|---|---|

FIRST EDGE RECORD ER.61

FIGURE 4B

THIRD ZONE CONNECTIVITY RECORD ZC.03

| ZC.03.ID | Z.ID.03 | Z.REC.04 | N15 | E.77 | E.TYPE.77 | Z.REC.04 | N.16 |
|---|---|---|---|---|---|---|---|
| E.84 | E.TYPE.84 | Z.REC.05 | N20 | E.94 | E.TYPE.94 | HIST | |

FIGURE 6

GRAPH ZONE AND CROSS-ZONE LINKS

FORMING ZONE RECORDS

OPTIONAL STEP 12.18 EXPANSION

ZONE CONNECTIVITY RECORDS

FIRST SUPER SUPER ZONE RECORD SSZ.REC.01

DBMS 218

| SSZ.REC.ID.01 | SSZ.ID.01 | SZ.REC.01 | SZ.REC.02 |
| SZ.REC.03 | SZ.REC.04 | SZ.REC.05 | |

FIGURE 16E

SPLITTING ZONES

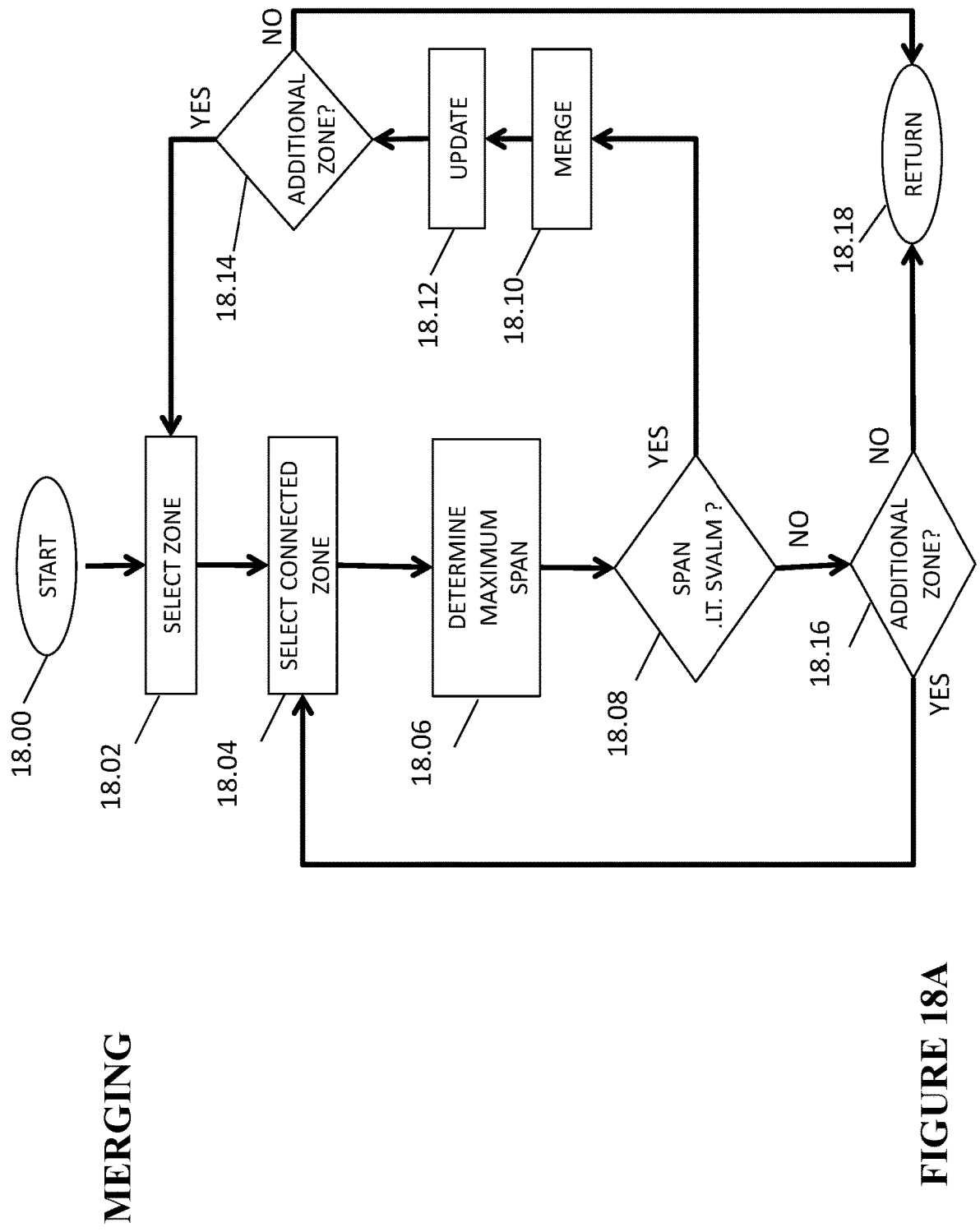

| ZR.ID.09 | Z.09.ID | NR.ID.09 | NR.ID.30 | NR.ID.31 | NR.ID.32 | NR.ID.33 | NR.ID.34 | NR.ID.35 | NR.ID.36 | NR.ID.37 |
|---|---|---|---|---|---|---|---|---|---|---|
| NR.ID.38 | NR.ID.39 | NR.ID.40 | NR.ID.42 | NR.ID.43 | ER.94 | E.TYPE. 94 | ER.103 | E.TYPE. 103 | ER.105 | E.TYPE. 105 |

TENTH ZONE RECORD Z.REC.10

FIGURE 18B

SYSTEM AND METHOD TO IDENTIFY ISLANDS OF NODES WITHIN A GRAPH DATABASE

CO-PENDING PATENT APPLICATIONS

This Nonprovisional Patent Application is a Continuation-in-Part Patent Application to Nonprovisional patent application Ser. No. 13/783,233 as filed on Mar. 2, 2013 by Inventor Leon Guzenda. Patent application Ser. No. 13/783,233 is hereby incorporated into its entirety and for all purposes into the present disclosure.

FIELD OF THE INVENTION

The present invention generally relates to performing searches within databases of information technology systems, and more particularly to searching representations of social graphs that are associated with electronically digitized information.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data and data sets can be represented in the form of a graph, namely, as a collection of entities that are associated or connected together by relationships. A graph is typically a structure consisting of a set of vertices and a set of edges used to represent relationships between the vertices, or nodes. For instance, a participation graph can be used to relate entities one to another based upon common conditions, properties, parameters, characteristics, activities, connections, and so forth, wherein each vertice may be associated with an existing or notional entity. An electronically represented social graph in the context of the Internet is a sociogram that depicts relationships between and among identifiable entities, such as wherein each vertice is associated with a distinguishable or identified individual, association, corporate entity, venture, business unit, physical object, equipment, physical or geographic feature, document and/or notional entity or abstraction. The full scope of graphing is meant to describe the relationships of any distinguishable entity with other entities. Such social graphs may be employed in analyses of corresponding data sets in many scenarios.

It is understood that an island is a group of connected nodes of a graph database, wherein each node of the instant group is connected to at least one other node of the same instant group by at least one edge, and no node of the instant group is connected by any edge to any node not included in the instant group Often, analysis of a graph involves searching for islands of nodes within a selected graph. In an example of a social media communications graph, searching for islands within a selected graph database may correspond to identifying an island of the graph to isolate identities represented by nodes within a graph that have no external communication behind a certain group of nodes of the graph. More generally, searching for islands within graphs may involve identifying isolated node groups, to include intentionally self-isolating node groups, to optimize some objective function. Efficiently discovering an island within a graph, though, can become quite difficult as the graph becomes larger (more vertices) and more dense (more edges between the vertices) due to the number of computations involved in the investigation of the graph in a hunt for islands. Prior art algorithms and methods used to perform searches to locate and identify islands within graph databases that arise in some scenarios are not optimally efficient.

There is therefore a long felt need to provide a method and device to improve the efficiency with which searches for islands of nodes within graph databases accessible via information technology systems and/or networks are performed.

SUMMARY OF THE INVENTION

Toward this and other objects that are made obvious in light of the disclosure, a method and system are provided for accessing graphs, including social graphs, in performing searches for islands of nodes within graphs, i.e., graph databases, accessed via an information technology system.

The invented method optionally comprises a process of sub-dividing graphs wherein designators are assigned to nodes. The assigned designators include dimensional values of layers of the graph and that further indicate membership of nodes within a zone(s) and/or subzones and/or node groupings. Designators generally include a a pattern of dimensional values wherein each dimensional value expresses a quality of a variate property of the associated node. The invented method optionally comprises generating selecting and interrogating at least some of a plurality these unique designators, wherein most designators comprise an assigned pattern of dimensional values that express membership in particular groupings of nodes.

It is understood that prior art generally models graphs as having nodes of a single type and links, or edges, of a single type. This invention specifically deals with graphs that have more than one node type and one or more link types between nodes, wherein the cardinality of all or a plurality of the relevant nodes is specified or may be determined by examination of particular graph comprising the nodes of interest.

Various alternate preferred embodiments of the method of the present invention, (hereinafter, "the invented Method") include one or more of the following aspects:
  a. Selecting a multiplicity of nodes;
  b. Deriving a designator for each node of the multiplicity of nodes and associating each designator in a one-to-one correspondence with a respective node from which a respective designator is derived;
  c. Each designator indicating a plurality of dimensional values, and each dimensional value expressing a quality of a variate property of an associated node;
  d. Selecting a unique designator having a particular pattern of dimensional values;
  e. Selecting a first node having a first node designator matching the particular pattern of dimensional values;
  f. Determining if the first selected node is connected any node not having a designator expressing the particular pattern of dimensional values ("an external node") by an edge.
  g. When an edge connecting the first selected node with an external node is found, halting the search process and processing the search as yielding a negative finding;

h. Repeating aspects e. through g. on each node having a designator expressing the particular pattern of dimensional values, until either a first instance of a negative finding is determined in an execution of aspect h., or no nodes having the particular pattern of dimensional values expressed in the respective designator of the instant node are connected by an edge to an external node; and i. when no node having the particular pattern of dimensional values expressed in the respective designator of the instant node is found to connected by an edge to an external node, reporting a positive finding of an island.

Additionally, alternatively or optionally, one or more other alternate preferred embodiments of the invented method comprise one or more of the following additional aspects: (a.) wherein the edge is defined as a communications modality; (b.) wherein the edge is defined as an edge type; (c.) wherein the edge type identifies a type of transaction; (d.) wherein the edge type identifies a type of transaction with an external node expressing a second particular plurality of dimensional values in its associated designator; (e.) wherein the edge type identifies a range of time-date values; (f) wherein the edge type identifies a time length value; (g.) wherein the edge type identifies at least two aspects of the edge; (h.) wherein at least one dimension is a geographic designation; (i.) wherein at least one node is associated with a group identity; (j.) wherein at least one node is associated with a personal identity; (k.) wherein at least one-dimensional values indicates inclusion within a superzone of a graph database; (l.) wherein at least one-dimensional values indicates inclusion within a zone of a graph database; (m.) wherein at least one dimensional value indicates inclusion within a layer of a graph database; (n.) wherein at least one dimensional value indicate an exclusion from at least one zone of a graph database; (o.) wherein the graph database management system includes at least one software object; (p.) wherein the graph database management at least one software object includes information describing at least one node; and (q.) wherein the at least one software object includes information defining the edge.

Various embodiments of the invented method provide techniques for graph zoning, e.g., node clustering and other groupings of representations of entities, or data associable with entities, as represented by or associated with nodes, node groupings zones, superzones and/or grouping of zones or superzones. In one or more embodiments, a source graph, such as a social graph, is analyzed that represents information related and relationships between entities. One or more zones of the graph ("graph zones") are derived from one or more source graphs. Graph zones may optionally be defined such that one or more graph zones are less dense than a source graph or graphs from which the graph zones are derived and the less dense graph zone or zones are therefore computationally less complex to analyze or utilize in searches. Graph zones derived from the source graph or graphs may then be utilized to more efficiently perform searches of the source graph or graphs.

In one aspect, a first graph is accessed that includes a plurality of nodes and edges between pairs of the plurality of nodes. Each edge is defined as a link between two nodes. A plurality of graph zones within the graph are defined or discovered and a search for a pathway from a first node of a first to an Nth node of an Nth zone is initiated, and a determination is first made whether a pathway exists between the first graph zone and the Nth graph zone. In addition, the present invention provides for alternatively or optionally determining the existence of edges between graph zones; forming a graph zone prior to initiating the search for a pathway; and forming a super graph zone graph prior to initiating the search for a pathway, wherein each group of connected graph zones of the super graph zone is presented as an individual node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The detailed description of some embodiments of the invention is made below with reference to the accompanying figures, wherein like numerals represent corresponding parts of the figures.

FIG. 4A is a representation an exemplary first node record of the database management system of FIG. 2 and FIG. 3;

FIG. 4B is a representation an exemplary first edge record of the database management system of FIG. 2 and FIG. 3;

FIG. 6 is a representation of an exemplary third zone connectivity record that includes identifications of the edges that connect zones of the exemplary first graph of FIG. 9;

FIG. 16E is a block diagram of an exemplary first super superzone record that defines the first superzone of FIG. 16D;

FIG. 18A is a flowchart of a merging of two zone records on the basis of the maximum span of any two nodes between two connected zones being less than a span minimum value; and FIG. 18B is a block diagram of a tenth zone record of FIG. 3 that is generated by merging the fifth and sixth zones of FIGS. 10 and 11.

DETAILED DESCRIPTION OF DRAWINGS

Figure 1:
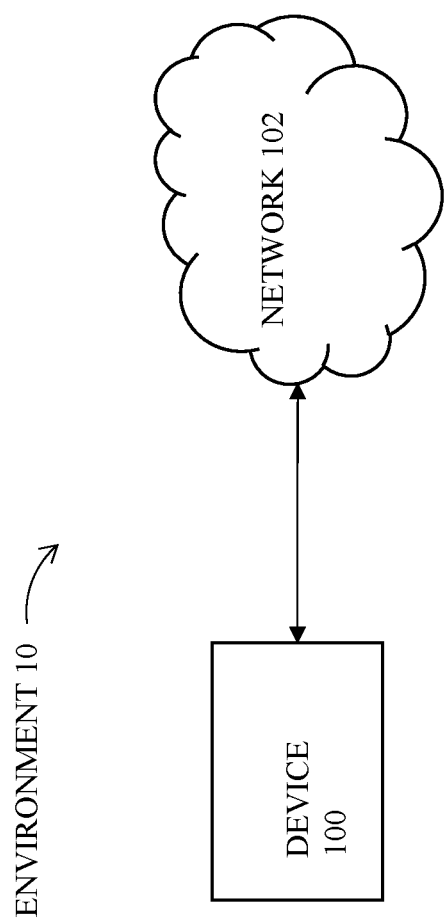
FIG. 1 is an example of an embodiment illustrating a computational environment that may be utilized in connection with the techniques described herein.

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. More particularly, computer storage media includes volatile and nonvolatile, removable and non-removable media implemented in any method or technology for storage of information such as computer readable instructions, data structures, program modules or other data. Computer storage media includes, but is not limited to, one or more magnetic disks, solid state memory, flash memory, file storage and/or block storage, and/or a cloud platform as a service, i.e., "PaaS", or any other medium known in the art which can be used to store the desired information and which can be accessed by an instruction execution system.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Additionally, it should be understood that any transaction or interaction described as occurring between multiple computers is not limited to multiple distinct hardware platforms, and could all be happening on the same computer. It is understood in the art that a single hardware platform may host multiple distinct and separate server functions.

Throughout this specification, like reference numbers signify the same elements throughout the description of the figures.

Figure 8:
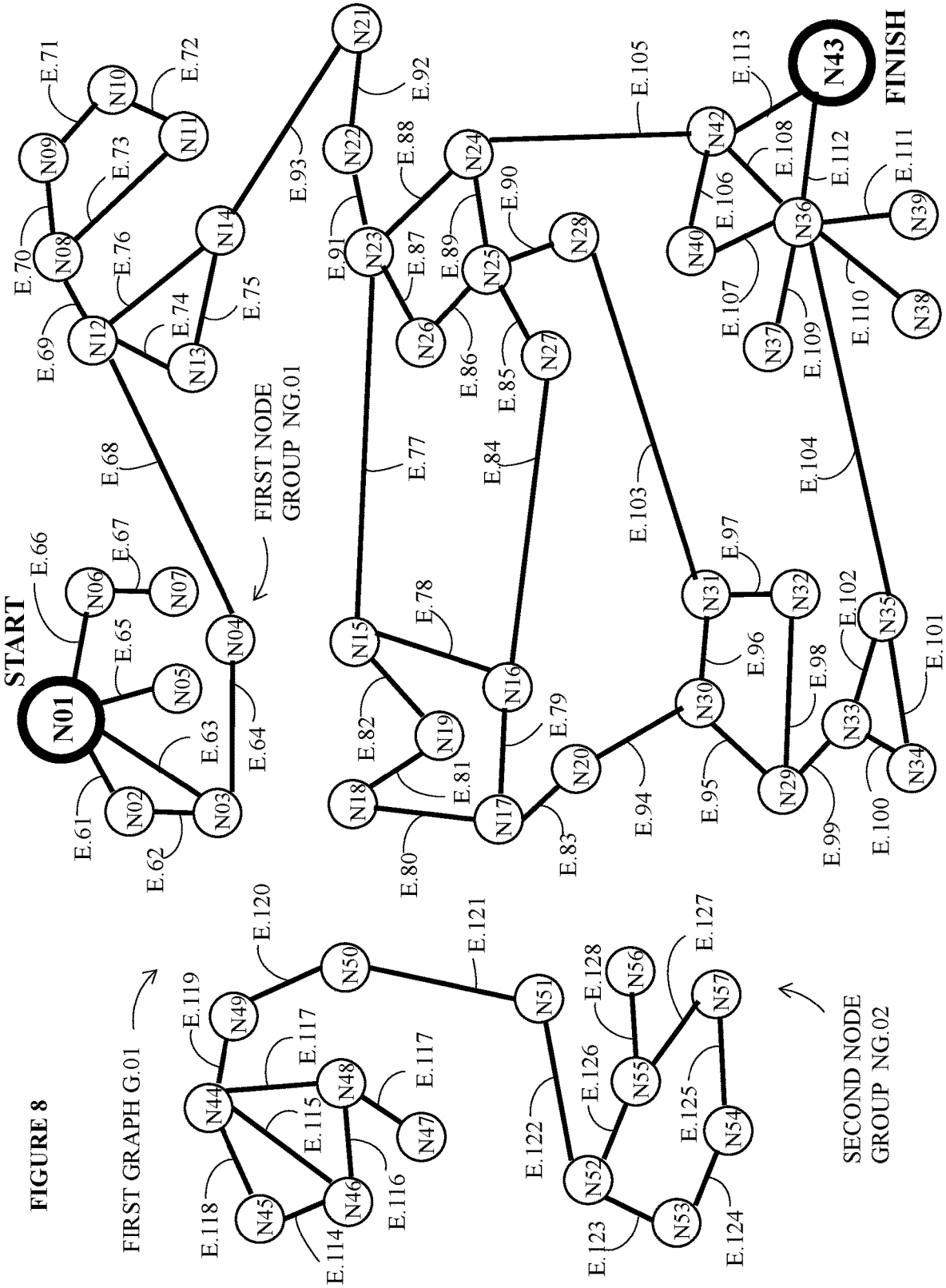
FIG. 8 is a graphical representation of an exemplary first graph as stored in the database management system of FIG. 2 and FIG. 3, and that comprises at least two separated node groupings.

Referring to FIG. 1, FIG. 1 presents an example of a suitable computing environment 10 in which embodiments utilizing the techniques described herein may be implemented. The computing environment 10 illustrated in FIG. 1 is only one example of a suitable computing environment and is not intended to suggest any limitation as to the scope of use or functionality of the techniques described herein in connection with analyzing, applying, relating and/or combining one or more social graphs G.01-G.2 or generating, defining, analyzing and applying zones A-H of FIG. 9. Referring to FIG. 8, an exemplary first graph G.01 is visually represented as a plurality of nodes N01-N57 that are connected by edges E.01-E.N that are then resolved into the zones A-H by application of certain aspects of the invented method as disclosed herein. It is understood that in certain alternate preferred embodiments of the invented method that the identification of any two nodes N01-N57 as being comprised within a same zone A-H or zone record Z.REC.01-Z.REC.N implicitly attests that a pathway of edges E.61-E.127 exists between the two included nodes N01-N57 of the comprising zone A-H or zone record Z.REC.01-Z.REC.N.

The techniques set forth herein may be described in the general context of computer-executable instructions, such as program modules, executed by one or more computers or other devices.

Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network personal computers, minicomputers, mainframe computers, distributed computing environments that include any of the above systems or devices, and the like.

Included in example environment 10 of FIG. 1 are a system 100 and a network 102. The network 102 may be or comprise the Internet, one or more telephony networks and/or one or more digital communications or computer networks. The system 100 may be, for example, a computer, such as a personal computer, having a display output device and an input device providing for interactive I/O with a user thereof. In following paragraphs, additional details are provided with respect to the system 100. However, the same details may also apply to one or more other devices that may be connected to the network 102 in an embodiment. Although the example 10 of FIG. 1 includes only a single device, an embodiment utilizing the techniques herein may include any number of devices and other components.

The system 100 included in FIG. 1 is exemplary for purposes of illustrating the techniques described herein in connection with software components. In one embodiment, any system 100 providing the functionality described herein may be included in an embodiment. The system 100 may include a processor used to execute code included in one or more program modules. Described in more detail elsewhere herein are program modules that may be executed by the system 100 in connection with the techniques described herein. The system 100 may operate in a networked environment and communicate with other computers or components not shown in FIG. 1. As described herein, the system 100 may be a personal computer. In other embodiments, the functionality of system 100, or the system 100 itself, may be included in another component in accordance with a particular environment in which the system 100 is utilized.

The system 100 may be or comprise (a.) an HP Z620 AutoCAD Workstation E5-1620v2™ marketed by Hewlett Packard Enterprise of San Jose, Calif. and running a WINDOWS 10 PROFESSIONAL™ 64-Bit operating system as marketed by Microsoft Corporation of Redmond, Wash.; (b.) a Dell Precision Mobile Workstation 3551-15.6"-Core i5 10300H™ marketed by Dell Corporation of Round Rock, Tex.; (c.) a MAC PRO™ workstation as marketed by Apple, Inc. of Cupertino, Calif.; and/or (d.) other suitable computational system or electronic communications device known in the art capable of providing networking and operating system services as known in the art capable of providing networking and operating system services as known in the art.

It will be appreciated by those skilled in the art that although the system 100 is shown in the example as communicating in the exemplary networked environment 10, the system 100 may communicate with other components utilizing different communication mediums. For example, the system 100 may communicate with one or more components utilizing a network connection, and/or other type of link known in the art including, but not limited to, the Internet, an intranet, or other wireless and/or hardwired connection(s) to the network and/or other components.

It should be noted that although the system 100 is illustrated as having network connectivity, the techniques described herein may be used in connection with a device or system operating standalone without such connectivity.

The system 100 and its functions as disclosed in the present disclosure are wholly or in part are comprised within, provided within, and/or made accessible via, or directly or indirectly via the network 102, including but not limited to a Virtual Machine and/or Platform as a Service, including but not limited to an Amazon Web Services (AWS) asset, a Microsoft Cloud (Azure) asset or service, a Google Cloud service or asset, and Oracle Cloud Infrastructure (OCI) asset or service, and/or one or more suitable internet-accessible assets or services in singularity, in concert or in combination.

Figure 2:
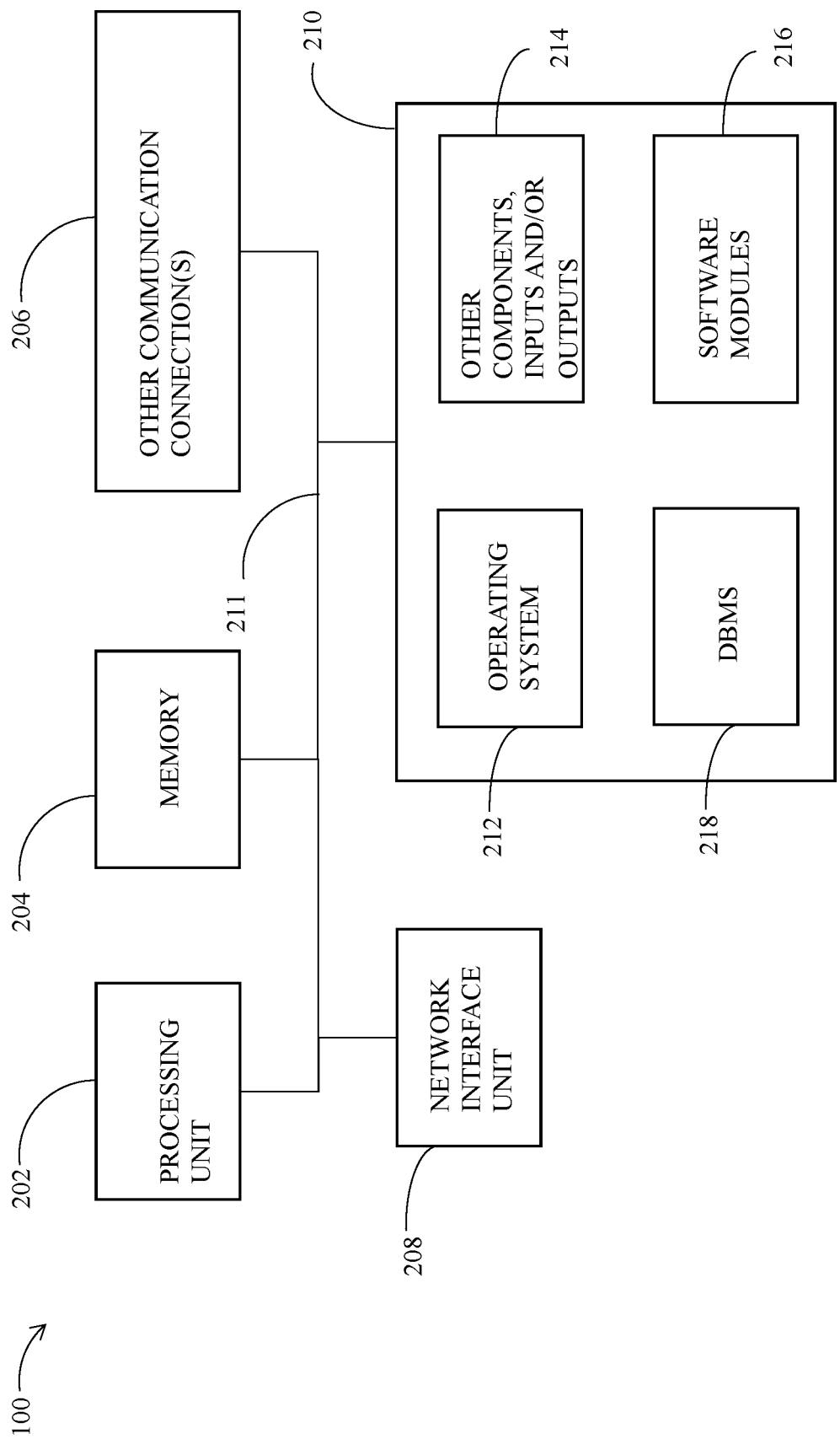
FIG. 2 is an example of an embodiment of components that may comprise a device of FIG. 1.

Referring to FIG. 2, shown is an example of components that may be included in the system 100 as may be used in connection with performing the various embodiments of the techniques described herein. The system 100 may include one or more processing units 202, memories 204, a network interface unit 208, storage 210, one or more other communication connections 206, and a system bus 211 used to facilitate communications between the components of the system 100.

Depending on the configuration and type of system 100, memory 204 may be volatile (such as RAM), non-volatile (such as ROM, flash memory, etc.) or some combination of the two. Additionally, the system 100 may also have additional features/functionality. For example, the system 100 may also include additional storage (removable and/or non-removable) including, but not limited to, USB devices, magnetic or optical disks, or tape. Such additional storage is illustrated in FIG. 2 by storage 210. The storage 210 of FIG. 2 may include one or more removable and non-removable storage devices having associated computer-readable media that may be utilized by the system 100. The storage 210 in one embodiment may be a mass-storage device with associated computer-readable media providing non-volatile storage for the system 100. Although the description of computer-readable media as illustrated in this example may refer to a mass storage device, such as a hard disk or CD-ROM drive, it will be appreciated by those skilled in the art that the computer-readable media may be any available media that can be accessed by the system 100.

By way of example, and not limitation, computer readable media may comprise computer storage media and communication media. Memory 204, as well as storage 210, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by system 100.

The system 100 may also contain communications connection(s) 206 that allow the computer to communicate with other devices and components such as, by way of example, input devices and output devices.

In one embodiment, the system 100 may operate in a networked environment as illustrated in FIG. 1 using logical connections to remote computers through a network. The system 100 may connect to the network 102 of FIG. 1 through a network interface unit 208 connected to bus 32. The network interface unit 208 may also be utilized in connection with other types of networks and/or remote systems and components.

One or more program modules and/or data files may be included in storage 210. During operation of the system 100, one or more of these elements included in the storage 210 may also reside in a portion of memory 204, such as, for example, RAM for controlling the operation of the user computer 12. The example of FIG. 2 illustrates various components including an operating system 212, programming modules 216, and other components, inputs, and/or outputs 214.

The operating system 212 may be any one of a variety of commercially available or proprietary operating systems provided in suitable computational system or electronic communications device known in the art capable of providing networking and operating system services, including but not limited to, an IBM Power System S924™ marketed by IBM, or Dell EMC PowerEdge Server™, The operating system 212, for example, may be loaded into memory in connection with controlling operation of the system 100. The modules 216 may include one or more executable code modules used in connection with performing the techniques as described herein for supporting efficient searches of graphs G.01-G.N.

The system 100 may be a server accessible via the Internet or other electronic telephony or communications network and may store the graphs G.01-G.N, one or more zone graphs ZG.01-ZG.N and/or the generated zones A-H in a database management system software 218, (hereinafter, "DBMS 218") such as an object oriented database system provided by Objectivity, Inc. of Mountain View, Calif. or an SQL database software management system as provided by IBM of Armonk, N.Y. The information technology system 100 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) a TOUGHPAD™ tablet computer as marketed by Panasonic Corporation of Kadoma, Osaka, Japan and running an ANDROID™ operating system as marketed by Google, Inc. of Mountain View, Calif.; or (g.) other suitable computational system or electronic communications device known in the art known in the art.

Figure 3:
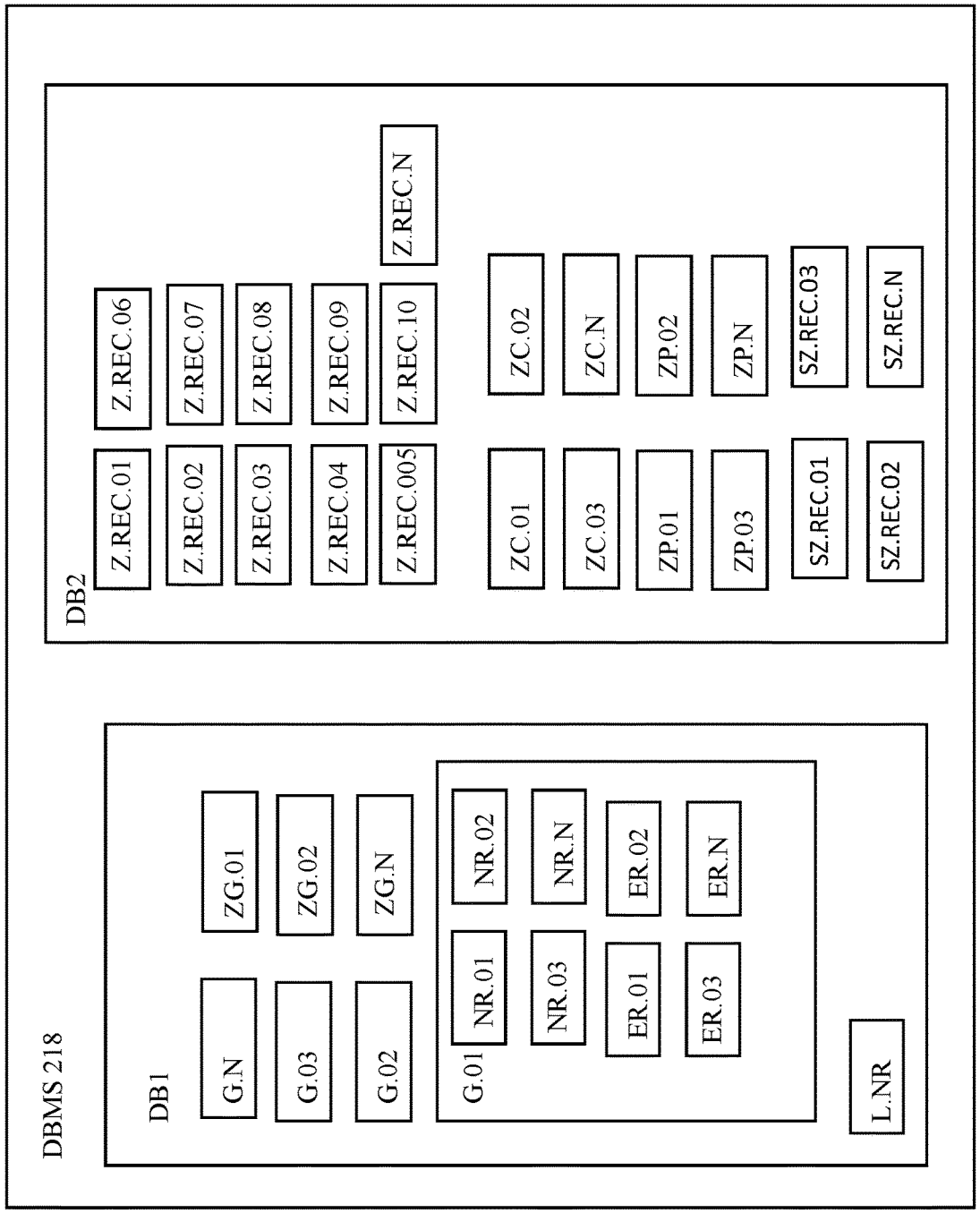
FIG. 3 is a representation of certain aspects of a database management system of FIG. 2 that support and store a plurality of graph records, to include an exemplary first graph record that defines the first graph of FIG. 8.

Referring now generally to the Figures and particularly to FIG. 3, FIG. 3 is a representation of aspects of the DBMS 218, wherein a first database DB.1 and a second database DB.2 are presented. The first database DB.1 includes a plurality of graphs G.01-G.N and zone graphs ZG.01-ZG.N, wherein an exemplary first graph G.01 is shown to comprise a plurality of node records NR.1-NR.N. The second database DB.2 is shown to include zone records Z.REC.01-Z.REC.N, zone connectivity records ZC.01-Z.REC.N and zone pathway records ZP.01-ZP.N.

Each zone record Z.REC.01-Z.REC.N includes or is associated with node records NR.1-NR.N that are respectively included within each respective zone A-H. For example, the first exemplary zone record Z.REC.01 includes or points to each zone record included with a first zone A of the exemplary first graph G.01.

Referring now generally to the Figures and particularly to FIG. 4A, FIG. 4A is a representation an exemplary first node record NR.01 of the first node NR01 of the DBMS 218. Each node record NR.01-NR.N includes (a.) a node record identifier NR.ID.01-NR.ID.57 that uniquely identifies the comprising node record NR.01-NR.N to the DBMS 218; and a node identifier N.ID.01-N.ID.N that identifies a particular and specified node N01-N57, or "instant node", defined or described by the instant node record NR.01-NR.N.

Each node record NR.01-NR.N preferably further comprises a node type identifier N.TYPE.01-N.TYPE.ID.N defines a type of the instant node; preferably one or more node identifiers N.ID.01-N.ID.N and/or node record identifiers NR.ID.01-NR.ID.57 of nodes N01-N57 to which the instant node is connected; identifiers of edges E.ID.61-E.ID.127 and/or edge record identifiers ER.ID.61-ER.ID.127, i.e. "links" E.61-E.127, that connect the instant node to other nodes N01-N57; one or more edge type indicators E.TYPE.61-E.TYPE.N of each edge E.61-E.N that links a node N01-N57 to the instant node. An optional node history data field NR.HIST.01 stores information regarding the history of the instant node.

It is understood the system 100 identifies and defines each edge E.61-E.127 as a link between two nodes N01-N57. It is further understood that an edge type indicator E.TYPE.61-E.TYPE.127 may indicate a uni-directionality or a bi-directionality of an identified edge E.61-E.127.

The exemplary first node record NR.01 of the first node NR01 includes (a.) a first node record identifier NR.ID.01 that uniquely identifies the first node record NR.01 to the DBMS 218; a first node identifier N.ID.01 that identifies the first node N01; a first node type identifier N.TYPE.01 that defines the type of the first node N01; separate node record identifiers NR.ID.02, NR.ID.03, NR.ID.05 & NR.ID.06 associated with each node N02, N03, N05 & N06 to which the first node N61 is connected and/or separate node identifiers N.ID.02, N.ID.03, N.ID.05 & N.ID.06 of each node N02, N03, N05 & N06 to which the first node N61; edge identifiers E.ID.61-E.ID.63. E.65 & E.66 of each edges E.61, E.63, E.65 & E.66, i.e. "links" E.61, E.63, E.65 & E.66, that connect the first node N01 to other nodes N02, N03, N05 & N06; edge type indicators E.TYPE.61, E.TYPE.63, E.TYPE.65 & E.TYPE.66 of each edge E.61, E.63, E.65 & E.66 linking to the first node N01. It is understood that an edge type indicator E.TYPE.61-E.TYPE.127 may indicate a uni-directionality or a bi-directionality of an associated edge E.61-E.127.

Referring now generally to the Figures and particularly to FIG. 4B, FIG. 4B is a representation an exemplary first edge record ER.61 of the first edge E.61 of the DBMS 218. Each edge record ER.01-ER.N includes (a.) an edge record identifier ER.ID.61-ER.ID.N that uniquely identifies the comprising edge record ER.01-ER.N to the DBMS 218; an edge identifier E.ID.61-E.ID.N that identifies the edge E.61-E.N that is described in the comprising edge record ER.61-E.N; an edge type indicator E.TYPE.01-E.TYPE.N that identifies a type of the instant edge E.01-E.N., i.e., E.TYPE.61 identifies the edge of the first edge E.61 in the exemplary first edge record E.61; and/or separate identifiers of each a pair of nodes N01-N.N that the instant edge connect and span and/or separate record identifiers NR.ID.01-NR.ID.61 of each node record NR.01-NR.61 of the pair of nodes N01-N.N that the instant edge connects and spans.

In the exemplary first edge record ER.61, a first edge record identifier ER.ID.61 uniquely identifies the exemplary first edge record E.61 to the DBMS 218; a first edge identifier E.ID.61 that uniquely identifies the first edge E.61 to the DBMS 218; a first edge type indicator E.TYPE.61 that identifies the type of the first edge E.61 to the DBMS 218; and two node identifiers N.ID.01 & N.ID.02 that uniquely identify the two nodes N01 & N02 that the first edge E.61 connects and spans. Identifications of the first node N01 and the second node N02 are included by reference or stipulation of either the first node identifier N.ID.01 and the second node identifier N.ID.02 and/or the first node record identifier NR.ID.01 and/or the second node record identifier NR.ID.02.

Figure 5:
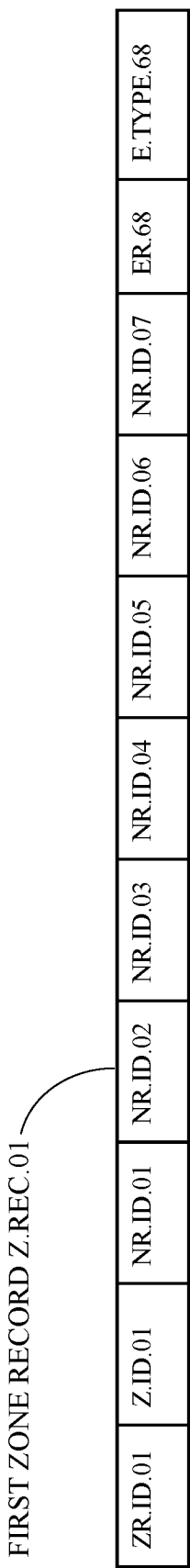
FIG. 5 is a representation an exemplary first zone record of the database management system of FIG. 2 and FIG. 3.

Referring now generally to the Figures and particularly to FIG. 5, FIG. 5 is a representation an exemplary first zone record Z.REC.01 of the database management system 218 that defines a first zone A as comprising seven nodes N01-N07. Each zone record Z.REC-01-Z.REC.N may include (a.) a node identifier N.ID.01-N.ID.57 of each node N01-N57 comprised within the zone A-H defined by the comprising zone record Z.REC-01-Z.REC and/or (b.) a node record identifier NR.ID.01-NR.ID.57 of each node record NR.01-NR.N of each node N01-N57 comprised within the zone A-H defined by the comprising zone record Z.REC-01-Z.REC. A zone record identifier ZR.ID.01-ZR.ID.N uniquely identifies the instant zone record Z.REC.01-Z.REC.N to the DBMS 218, wherein a first zone identifier Z.ID.01 identifies the first zone A to the DBMS 218.

The exemplary first zone record Z.REC.01 comprises a first zone record identifier ZR.ID.01 that uniquely identifies the first zone record Z.REC.01 to the DBMS 218 and a first zone identifier Z.ID.01 that is uniquely associated with the first zone A to the DBMS 218. The exemplary first zone record Z.REC.01 may optionally include references to (a.) external links E.68., e.g., an external link record ER.68 or an edge identifier E.ID.61, and (b.) edge type E.TYPE.68, that provide a pathway from the instant first zone A to another zone B-H. It is understood that each zone record Z.REC.01-Z.REC.N may optionally include one or more edge records ER.61-ER.N of edges E.61-E.N that provide a pathway from an instant first zone A-H to another zone A-H and/or references to (a.) each edge E.61-E.127 that defines an external link to another zone A-H; and (b.) optionally the edge type E.TYPE.61-E.TYPE.127 of each external link.

Referring now generally to the Figures and particularly to FIG. 6, FIG. 6 is a representation of an exemplary third zone connectivity record ZC.03 that includes a third zone record identifier ZC.03.ID, identifications of the external edges E.77, E.84 & E.94 and their respective edge types E.TYPE.77, E.TYPE.84 & E.TYPE.94 that connect the third zone C to other zones D & E and the respective zone records Z.REC.03 & Z.REC.05 that define the zones D & E to which the instant third zone C has connectivity. In other words, the third zone connectivity record ZC.03 further references each external edge E.77, E.84 & E.94 that extends from nodes N15, N16 & N20 located within the third zone C, respectively, to the fourth zone D and the fifth zone E, and each of the internal zones N15, N16 & N20 of Zone C that are connected by these external edges E.77, E.84 & E.94 to other zones D & E. The third zone connectivity record ZC.03 optionally further includes historical data HIST concerning the structural content of the third zone C and data concerning the relatedness of the third zone C to the additional zones A, B & E-H of the first graph G.01.

Figure 9:
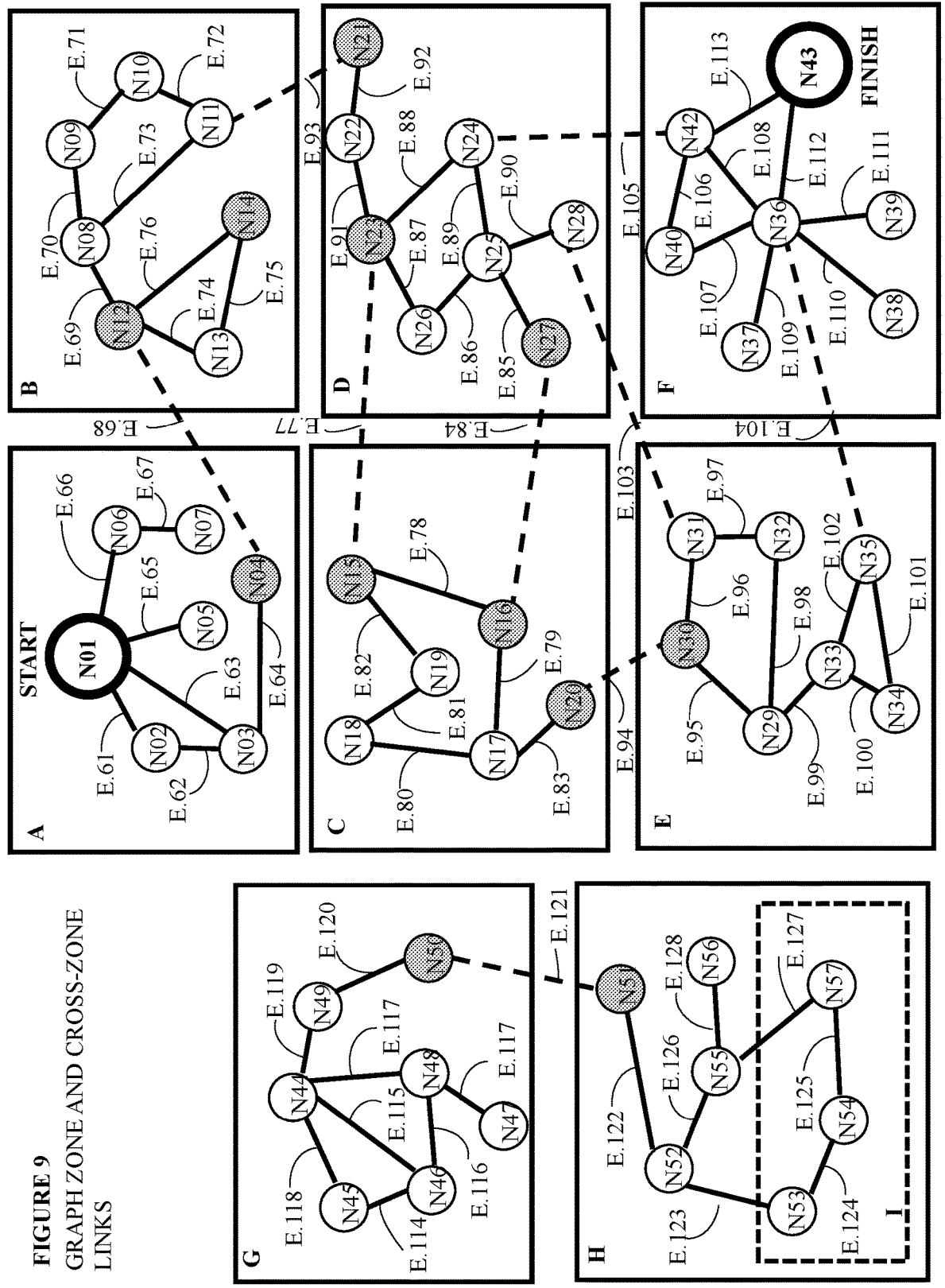
FIG. 9 is a graphical representation of an exemplary first graph of FIG. 8 resolved into a plurality of zones.

It is understood that the fourth zone record Z.REC.04 defines zone D, as represented at least in FIG. 9, includes or references nodes N21-N28, node identifiers N.ID.21-N.ID.28, node record identifiers NR.ID.21-NR.ID.28 and/or node records NR.21-NR.28 that each individually reference particular nodes N21-N28, and the respective connecting external edges E.77, E.84, E.103 & E.105 of zone D. It is further understood that the fifth zone record Z.REC.05 defines zone E, as also presented at least in FIG. 9, includes or references nodes N29-N35, node identifiers N.ID.29-N.ID.35, node record identifiers NR.ID.29-NR.ID.35 and/or node records NR.29-NR.35 that each individually reference particular nodes N29-N35 and the respective connecting external edges E.94, E.103 & E.104 of zone E.

Figure 7:
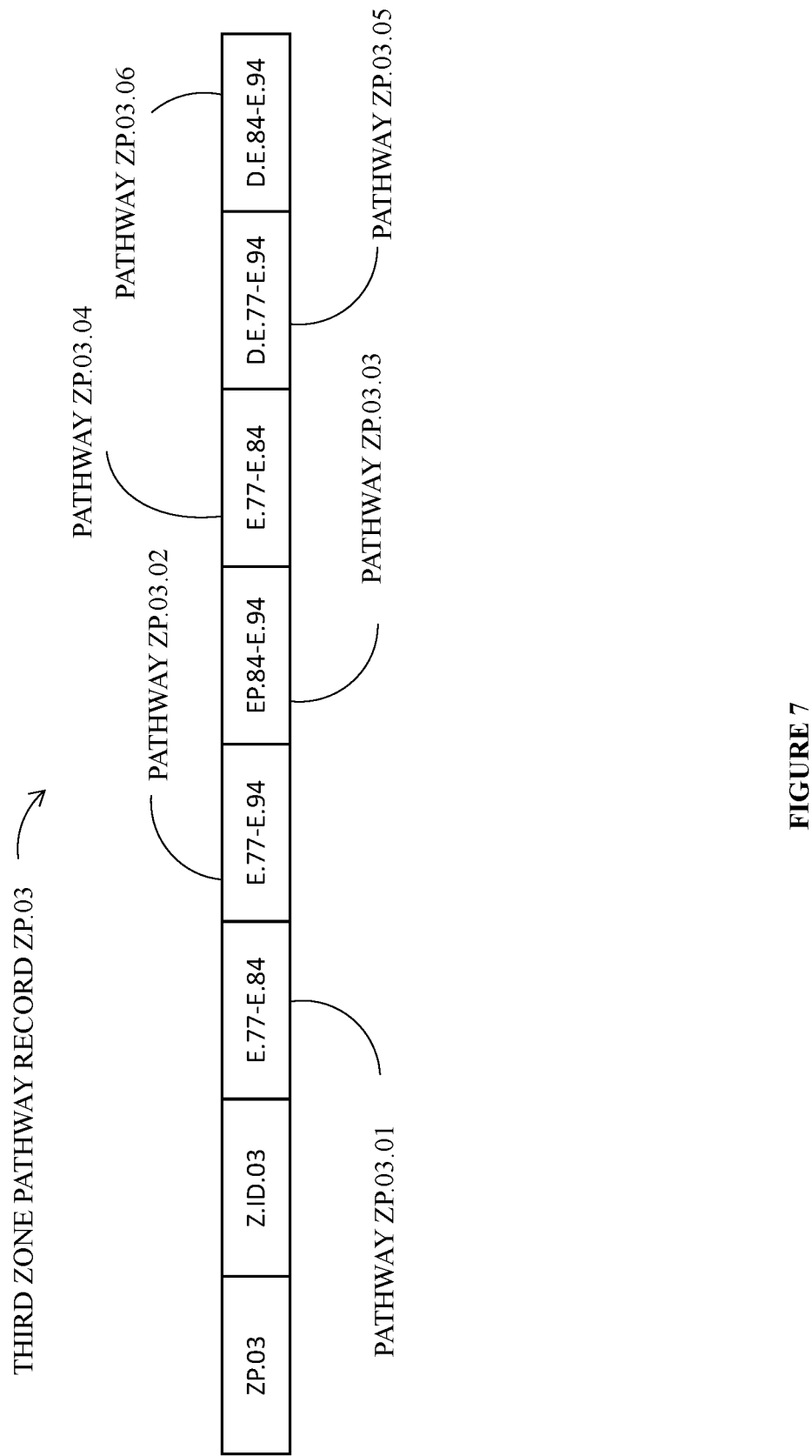
FIG. 7 is a representation of an exemplary third zone pathway record as stored in the database management system of FIG. 2 and FIG. 3, and that includes notations of internal pathways that each lead between a pair of border nodes.

Referring now generally to the Figures and particularly to FIG. 7, FIG. 7 is a representation of an exemplary third zone pathway record ZP.03 that includes notations of internal pathways ZP.03.01-ZP.03.06 of nodes N16-N20 and internal edges E.78-E.83, wherein each internal zone pathway spans and connects a pair of border nodes N15, N16 & N20 of the third zone C, wherein each border node N15, N16 & N20 is connected by an external edge E.77, E.84 & E.94 that each connect the third zone C to another zone D & E. It is understood that where pathways within the third zone C are bi-directional, that only one pathway need be stored between pairs of border nodes N15, N16 & N20, whereas additional pathways ZP03.04-ZP03.06 may be included to provide alternate pathway directionality. Each zone pathway record ZP.01-ZP.N further includes a zone pathway record identifier ZP.ID.01-ZP.ID.N, a zone identifier Z.ID.01-Z.ID.N and/or a zone identifier ZR.ID.01-ZR.ID.N The exemplary third zone pathway record ZP.03 includes a third pathway record identifier ZP.03 and an identifier of the third zone C, e.g., a third zone identifier Z.ID.03 of the third zone C and/or a third record zone identifier ZR.ID.03 of the third zone record Z.REC.03 that defines or describes the third zone C.

It is understood that separate zone pathway records ZP.01.ZP.N, may be kept for individual zones A-I, or for each zone A-I, wherein each zone pathway record ZP.01.ZP.N may include notations and stipulations of internal pathways of edges E.61-E.127 and nodes N01-N57 that form separate pathways between a pair of border nodes N01-N57 of a particular zone A-I.

Referring now generally to the Figures and particularly to FIG. 8, FIG. 8 is a graphical representation of an exemplary first graph G.01 that comprises at least two separated node groupings NG.01-NG.02. The first node grouping includes nodes N01 through N43 and a second node grouping includes nodes 44 through 57.

It is understood that the first node grouping NG.01 and a second node grouping NG.02 do not present a linking edge and that these two node groupings NG.01-NG.02 are isolated from each other, whereby no pathway can be constructed from any node N44-N57 of the first node grouping NG.01 to any node N43-N43 of the second node grouping NG.02

In one exemplary search process, a pathway is sought by a selection of a plurality of edges E.1-E.N from a first start node N01 to a first finish node N43. The prior art methods of graph structuring and query execution often produce suboptimal performance behaviors, include, for example, (a.) traversals of numerous paths of edges E.1-E.N that fail to successfully define a pathway from the first start node N01 to the sought after first finish node N43, and/or (b.) fail to efficiently produce the shortest pathway between the first start node N43 to the first finish node N43. In addition, using two or more prior art parallel search agents may simply result in two or more search agents of a same prior art search engine query process traversing identical links of substantively similar search pathways of edges E.61-E.128.

FIG. 9 is a representation of a first step of a first aspect of the invented method, wherein eight zones A through H are derived from the nodes N01-N57 of the first graph G.01. It is shown in FIG. 9 that certain zone pairs A-B, B-D, C-E & G-H are connected by a single external edge E.68, E.93, E.94, E.103, E.105 & E.121, or "cross-zone links" E.68, E.93, E.103 & E.105. More particularly zone A is linked to zone B by an external edge E.68, zone B is linked to zone D by an external edge E.93, zone C is linked to zone E by an edge E.94, zone D is linked to zone E by an external edge E.103, zone D is further linked to zone F by an external edge E.105, and zone G is linked to zone H by an external edge E.121.

It is further shown that a pair of zones A-H may be linked separately by more than one cross-zone link, e.g., zone C is linked with zone D by a pair external edges E.77 & E.84 It is also shown that one or more zones G & H may be isolated and not linked at all with other zones A-F, e.g., zone G and zone H are linked only with each other and not linked at all with zones A through zone F.

Figure 10:
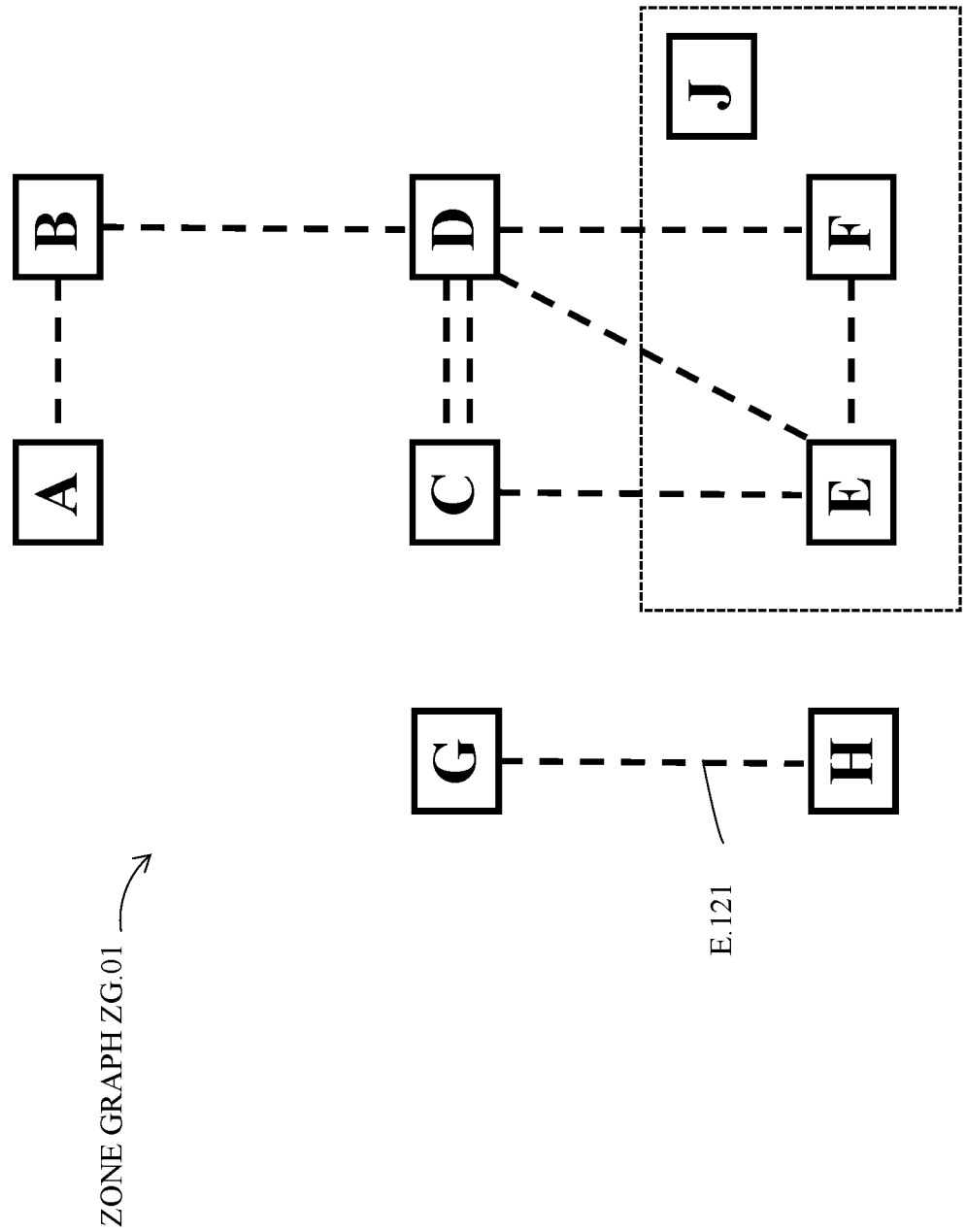
FIG. 10 is an illustration of an exemplary first zone graph that presents the zones and edges of FIG. 9 as fundamental elements.

FIG. 10 is a representation of a first zone graph ZG.01 that is an abstraction of (a.) the defined zones A-H of FIG. 2 and (b.) the particular external zone edges E.68, E.77, E.84, E.93, E.94, E.103, E.105, & E.121 that are the indicated cross-zones links E.68, E.77 & E.84, E.93, E.94, E.103, E.105, & E.121 found between, and connecting, two separate and distinguishable zones A-H of the first graph G.01. As noted above, each separate cross-zone link E.68, E.77, E.84, E.93, E.94, E.103, E.105, & E.121 is an edge that enables a pathway between two individual zones A-H. A potential ninth zone I is shown as being formed by a possible merger of the fifth zone E and the sixth zone G.

Figure 11:
FIG. 11 is a representation of the first zone graph of FIG. 10 as an electronic record.

Referring now generally to the Figures and particularly to FIG. 11, FIG. 11 is a representation of an exemplary first zone graph record ZG.01 that contains references to each zone record Z.REC.01-Z.REC.08 that may be instantiated within the instant first zone graph ZG.01 to present the connectivity of zones A-H. The first exemplary zone graph record ZG.01 further includes a first zone graph record identifier ZG.ID, a first zone graph identifier ZG.01.ID and optionally references to connecting cross-links E.68, E.77 & E.84, E.93, E.94, E.103, E.105, & E.121.

Figure 12:
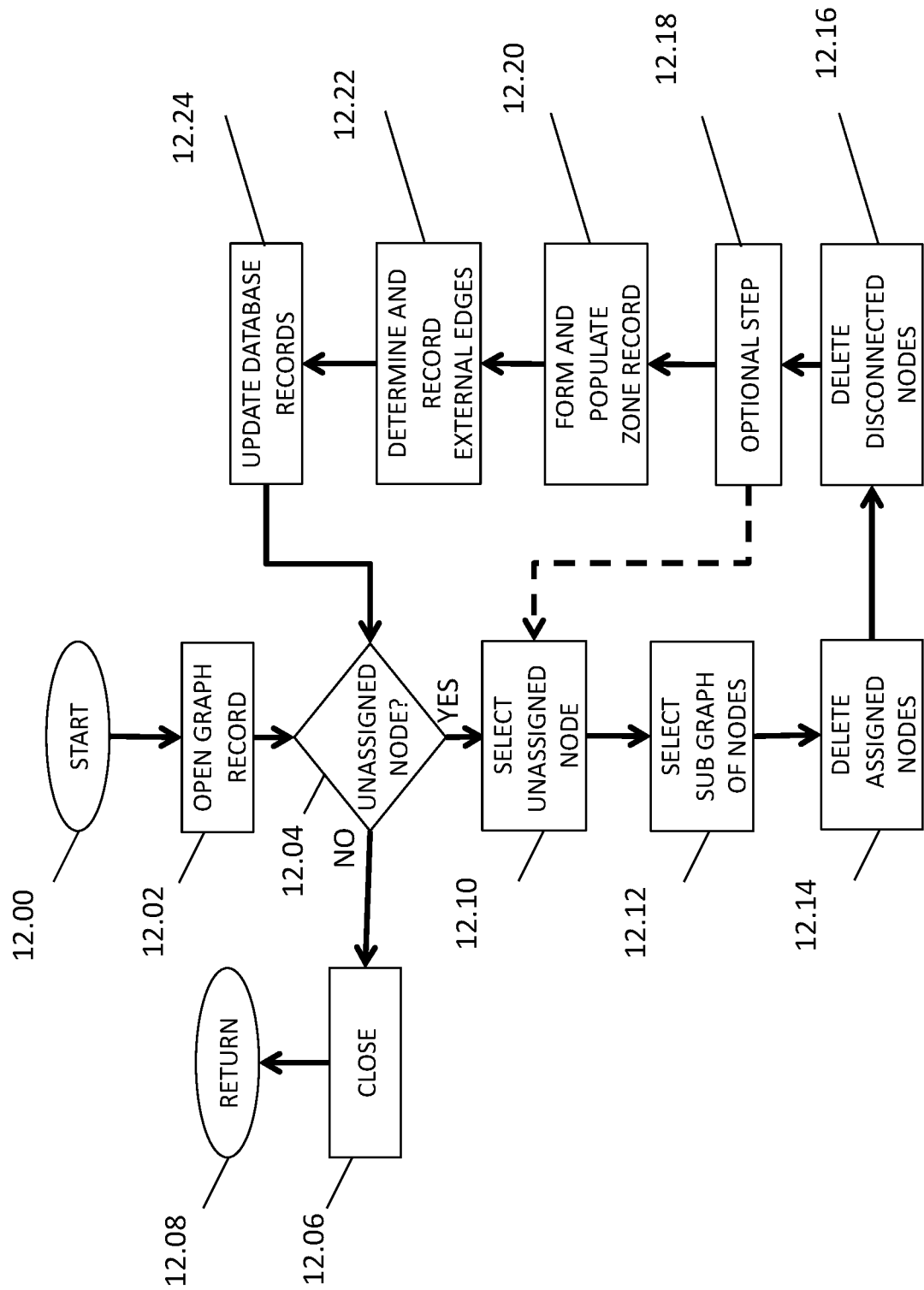
FIG. 12 is a representation of a first step of a first aspect of the invented method, wherein eight zones A through H are derived from the first graph as stored in the database management system of FIG. 2 and FIG. 3.

Referring now generally to the Figures and particularly to FIG. 12, FIG. 12 is a flowchart of an aspect of the invented method wherein a graph G.01-G.N is automatically and/or with human intervention separated into zones A-H by examination of nodes N01-N57 for assignment, inclusion by reference, to a zone record Z.REC.01-Z.REC.N. In step 12.02 the system 100 selects a graph record G.01-G.N. For the purposes of clarity of explanation, and not intended as limitation, the method of FIG. 12 will be discussed as applied to the first exemplary graph G.01. It is understood that one or more aspects of the invented method may be applied to other graphs G.02-G.N.

After the system 100 selects and opens the exemplary first graph G.01 in step 12.02, the device determines if there are any node records NR.01-NR.N of the first graph record G.1 that are unassigned or unreferenced by a zone record Z.REC.01-Z.REC.N. When no unassigned or unreferenced node records NR.01-NR.N are found in step 12.04, the system 100 proceeds on to step 12.06 and closes the first graph G.01 and proceeds therefrom to perform alternate computational operations in step 12.08.

When at least one unassigned or unreferenced node record NR.01-NR.N is found in step 12.04, the system 100 proceeds from step 12.04 to step 12.10 and to select an unassigned/unreferenced node record NR.01-NR.N and then in step 12.12 creates and populates a temporary node record list L.NR that includes all node records NR.01-NR.N that indicate a node N61-N128 that is positioned within a subgraph criterion, such as a prespecified span value from the node record NR.01-NR.N selected in step 12.06. The system 100 next, in step 12.14, deletes all node records NR.01-NR.N from the list L.NR of step 12.08 that are currently assigned to or referenced by a zone record Z.REC.01-Z.REC.N. The system 100 then deletes in step 12.16 from the list L.NR any node record that, as a consequence of the deletions of step 12.10, defines a node N01-N57 that is not connected to the node N01-N57 selected in the most recent execution of step 12.06. In optional step 12.18 the system 100 deletes or merges the resultant list L.NR if the list L.NR includes less than a prespecified number of node records N.01-N.N, i.e., lists L.NR referencing of only one node record NR.01-NR.N may be deleted, in which case the system 100 proceeds from step 12.14 to step 12.04 and selected a different starter node N01-N57 in the succeeding execution of step 12.06.

In the alternative, when the device proceeds from step 12.16 directly to step 12.20, or from step 12.18 to step 12.20, the system 100 creates a new zone record Z.REC.01-Z.REC.N and populates the new zone record Z.REC.01-Z.REC.N with references to the node records NR.01-NR.N remaining on the list L.NR. In optional step 12.22 the system 100 may add cross-link references to external edges E.61-E.127, and optionally edge type E.TYPE.61-E,TYPE.127 reference thereto, to the newly created zone record Z.REC.01-Z.REC.N and in step 12.24 the system 100 updates the other zone records Z.REC.01-Z.REC.N to reflect the formation and content of the newly created zone record Z.REC.01-Z.REC.N of the last execution of step 12.20. The system 100 preferably proceeds through the loop of steps 12.04 and 12.10 through 12.24 until all nodes are assigned to or referenced by a zone record Z.REC.01-Z.REC.N.

Figure 13:
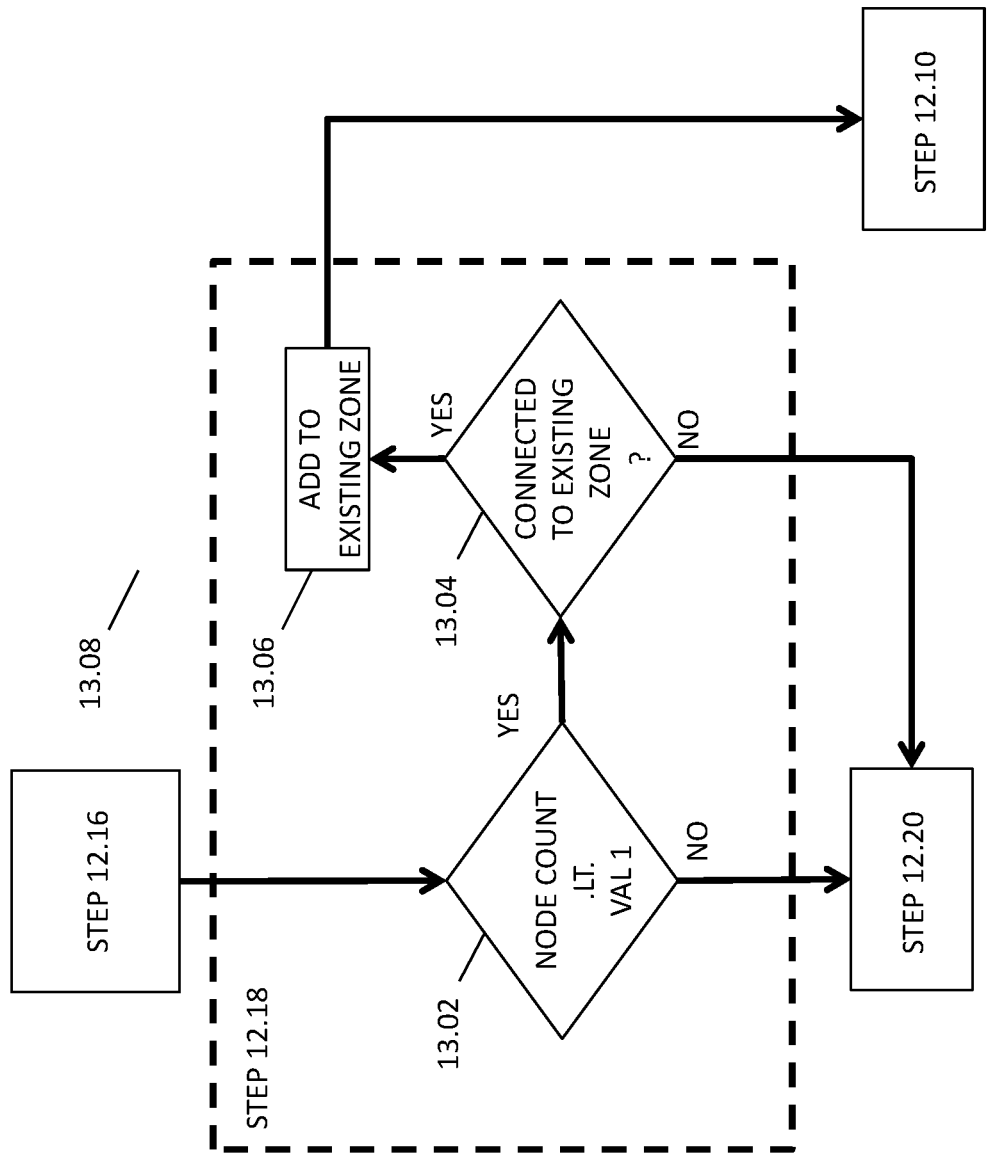
FIG. 13 is a flowchart of optional aspects of the invented method wherein a list of node records of FIG. 3 and FIG. 4 are either merged into an existing zone record of FIG. 3 and FIG. 5 or dissolved for additional reconsideration of inclusion into a newly formed or preexisting zone record.

Referring now generally to the Figures and particularly to FIG. 13, FIG. 13 is a flowchart of optional aspects of the invented method, wherein the resultant list L.NR of step 12.16 is examined to determine in step 12.18 to possibly (a.) be deleted without inclusion in a new zone record Z.REC.01-Z.REC.N; or (b.) to be merged into an existing zone record Z.REC.01-Z.REC.N. In step 13.02 the system 100 examines whether the count of unassigned/unreferenced node records NR.01-NR.N is less than a prespecified minimal node count value VAL1. When the system 100 determines I step that the count of unassigned/unreferenced node records NR.01-NR.N is not less than the minimal node count value VAL1, the system 100 proceeds from step 13.03 to step 12.20 of the process of FIG. 12.

When the system 100 determines in step 13.02 that the count of unassigned/unreferenced node records NR.01-NR.N is less than the minimal node count value VAL1, e.g., where VAL1 equals the integer 2 or perhaps the integer 3, the system 100 proceeds from step 13.02 to step 13.04 and determines if the node record(s) NR.01-NR.N of the list L.NR indicate an edge connection to an existing zone A-H, and if so found, the remaining node record(s) NR.01-NR.N of the list L.NR are merged onto the corresponding connected zone record Z.REC.01-Z.REC.N in step 13.06.

The system 100 may alternately proceed from step 13.04 to step 12.20 when no shared edge connection is found between the remaining node records NR.01-NR.N of the list L.NR and an existing zone record Z.REC.01-Z.REC.N.

Figure 14:
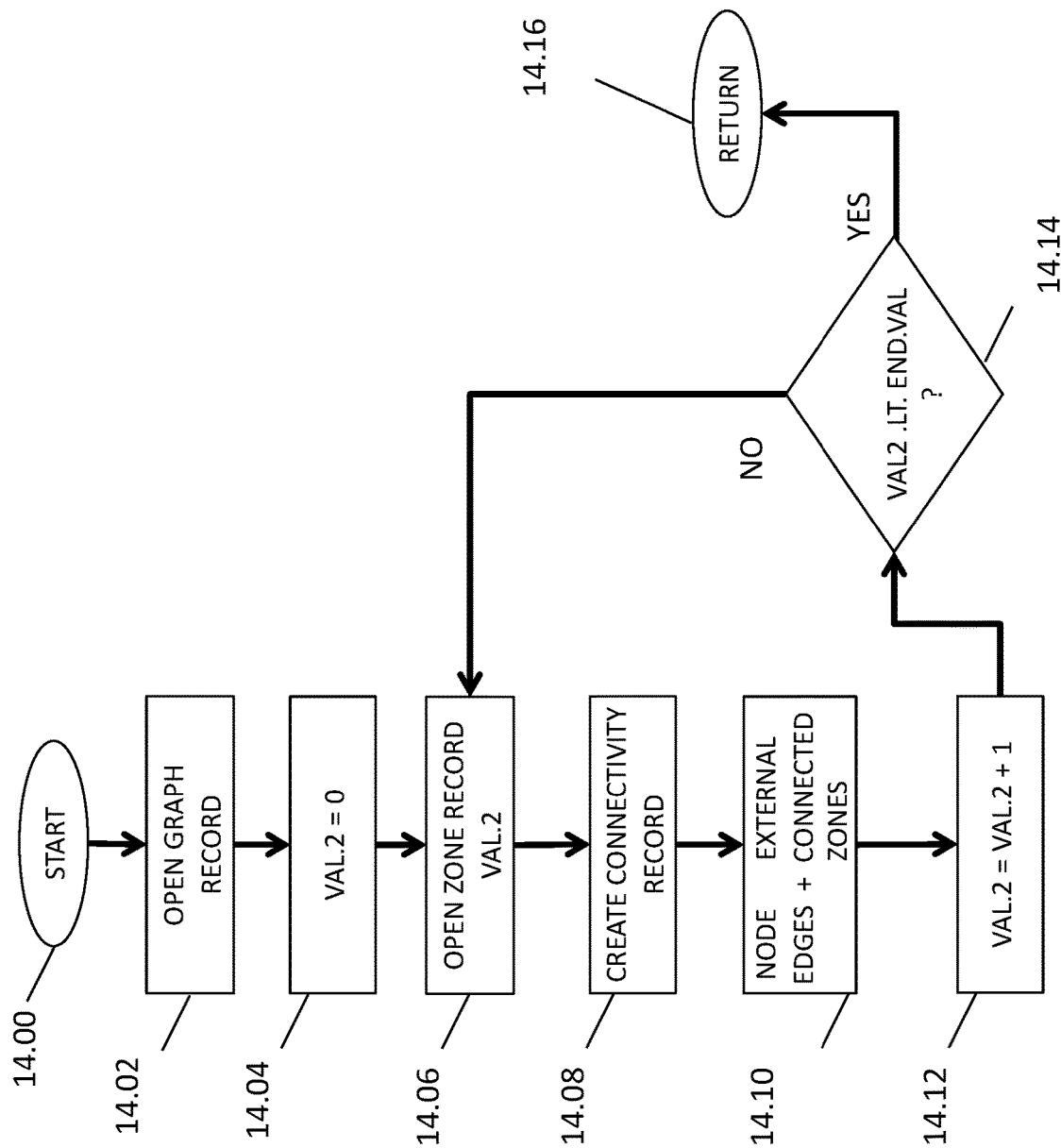
FIG. 14 is a flowchart of optional aspects of the invented method, wherein a process of generating the zone connectivity records of FIG. 6 derived from a graph record of FIG. 2 and FIG. 3.

Referring now generally to the Figures and particularly to FIG. 14, FIG. 14 is a flowchart of optional aspects of the invented method, wherein a process of generating the zone connectivity records ZC.01-ZC.N of a graph G.1-G.N is generated. For the purpose of clarity of explanation only, and not meant as limitation, the first graph G.1 will be referred in the following explanation of the process of FIG. 14.

In step 14.02 an individual graph G.01-G.N is opened and the number of zones A-H of the open graph G.1 is counted. In step 14.04 counter VAL2 is initialized to zero, and an ending value END.VAL of the counter is set equal to the number of zones A-H that are comprised within the instant graph G.1. In step 14.06 a first zone record Z.REC.01 that defines a first zone A is opened and a corresponding first zone connectivity record ZC.01 is initiated in step 14.08 by populating the first zone connectivity record with a first zone connectivity record identifier ZC.01 and a first zone identifier ZC.01.ID. In step 14.10 the first zone connectivity record ZC.01 is populated with a reference to each border node N04 of the first zone A, each external edge E.64 of the first zone A, and optionally a type indicator E.TYPE.68 of each external edge E.68, and a zone record identifier Z.REC.02 of each zone B that the first zone A is linked to. The second counter VAL2 is incremented in step 14.12, and if the second counter VAL2 is found in step 14.14 to be less than the total number of zones A-H of the first graph G.1, the device 2 proceeds on to another cycle of steps 14.06 through 14.14 and to generate and populate an additional zone connectivity record ZC.01-ZC.08. Alternatively, when second counter VAL2 is found in step 14.14 to be equal to or greater than the total number of zones A-H of the first graph G.1, system 100 proceeds on to step 14.16 and to perform alternate computational processes.

Figure 15:
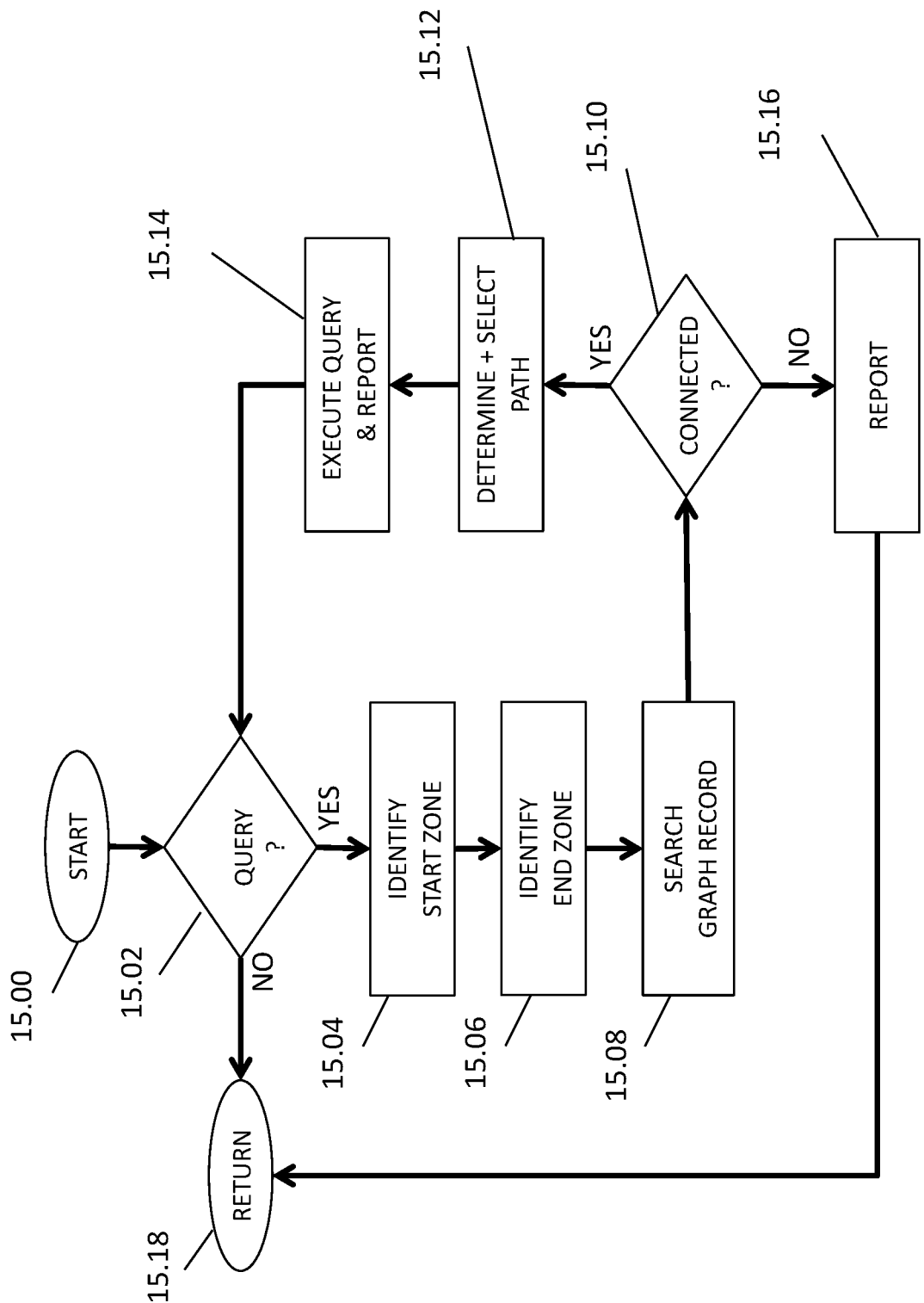
FIG. 15 is a flowchart of a query process of the invented method wherein the content and connectivity of zones of the graph of FIG. 8 are first investigated to efficiently determine whether a pathway of nodes and edges exists between a start node and an end node of a search query.

Referring now to generally to the Figures and particularly FIG. 15, FIG. 15 is a flowchart of a query process of the invented method wherein the content and connectivity of zones A-H is first investigated to efficiently determine whether a pathway of nodes N01-N57 and edges E.61-E.127 exists between a start node and an end node as specified or referenced in a search query. The system 100 determines in step 15.02 if a query identifying a start node and an end node has been received. When the system 100 determines in step 15.02 that a query has been received, the system 100 proceeds on to step 15.04 to determine which zone A-H of the first graph G.1 comprises the start node, and in step 15.06 determines which zone A-H comprises the end node.

The system 100 then searches in step 15.08 for connectivity between the start zone that comprises the start node of the search query and the end zone that comprises the end node of the search query. The system 100 then determines in step 15.10 whether the start zone and the end zone are connected, and when connectivity between the start zone and the end zone is determined in step 15.10, the system 100 proceeds on to step 15.12 to determine and select one or more pathways of edges and nodes that exist between the start node and the end node. The system 100 proceeds from step 15.12 to step 15.14 to execute the query received in step 15.02 and report the results of the query. The device 15.14 proceeds from step 15.14 to step 15.02 and to determine if an additional search query has been received. In the alternative, when the system 100 determines in step 15.10 that the start zone and the end zone are not connected, the device proceeds on to step 15.16 and to report a failure of the search query of step 15.02.

Referring now to generally to the Figures and particularly FIGS. 16A-16D, FIG. 16A is a visual representation of an exemplary first superzone SZ.01 that comprises a plurality of zones A-F. The invented method, in certain optional aspects thereof, can be recursively adapted to form graphs of super zones, e.g., super-superzones, to any needed depth of hierarchy of collections of nodes, zones, superzones, super zones, graphs, and pluralities of graphs.

It is further understood that in certain alternate preferred embodiments of the invented method that the identification of any two nodes N01-N43 as being comprised within a same superzone SZ.01 implicitly attests that a pathway of edges exists between the two included nodes N01-N43 of the comprising superzone SZ.01.

Figure 16A:
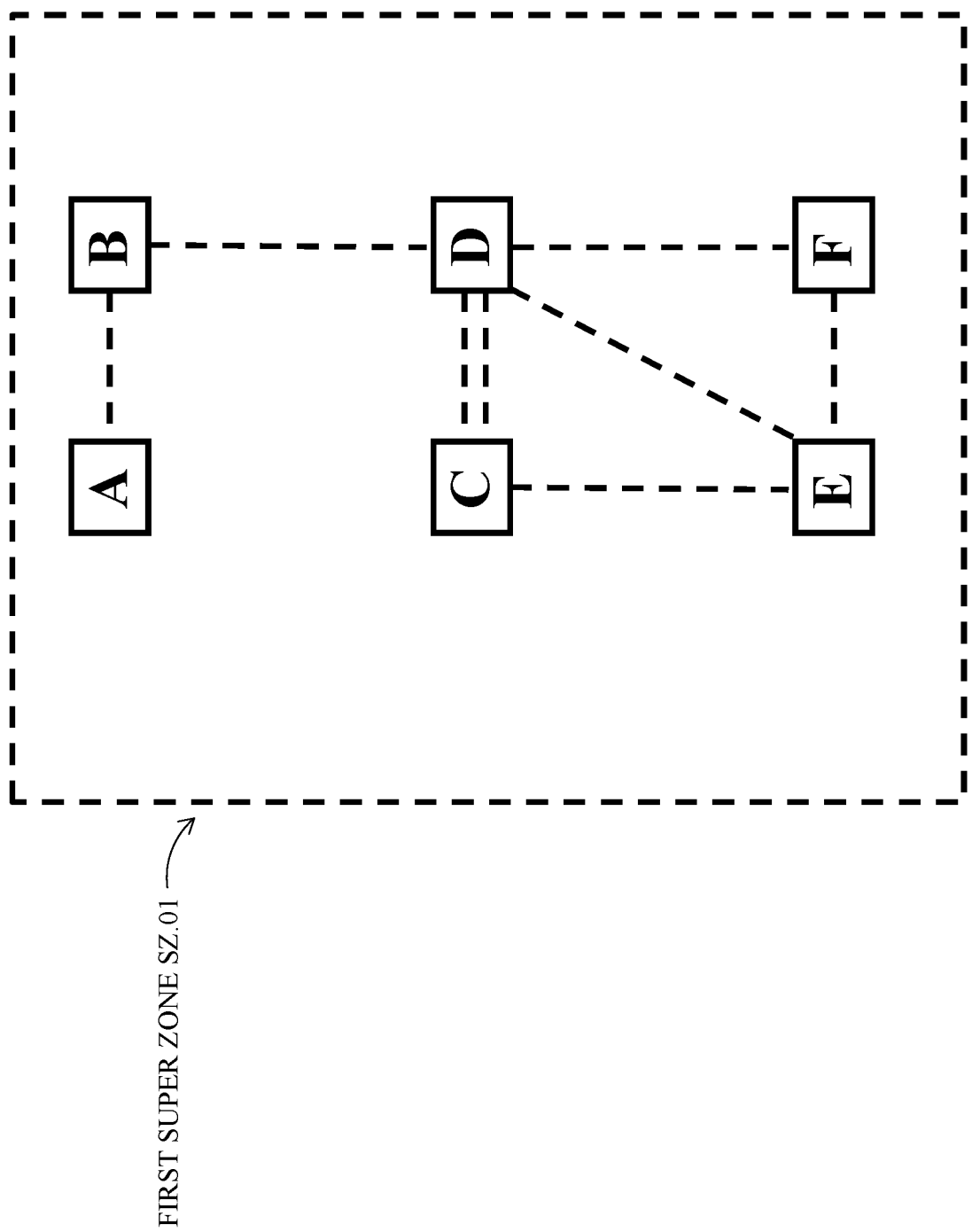
FIG. 16A is a visual representation of an exemplary first superzone that comprises a plurality of zones of FIG. 9.
Figure 16B:
FIG. 16B is a block diagram of an exemplary first superzone record that defines the first superzone of FIG. 16A.

FIG. 16B is a block diagram of an exemplary first superzone record SZ.REC.01 that defines the first superzone SZ.01. The first superzone record SZ.REC.01 includes (a.) a first superzone record identifier SZ.REC.ID.01 that uniquely defines the first superzone record SZ.REC.01 to the system 100; (b.) a first superzone identifier SZ.ID.01 that uniquely defines the first superzone SZ.01 to the system 100; and (c.) a plurality of zone records Z.REC.01-Z.REC.06 that separately each define a unique zone A-F that are comprised within the exemplary first superzone SZ.01.

Figure 16C:
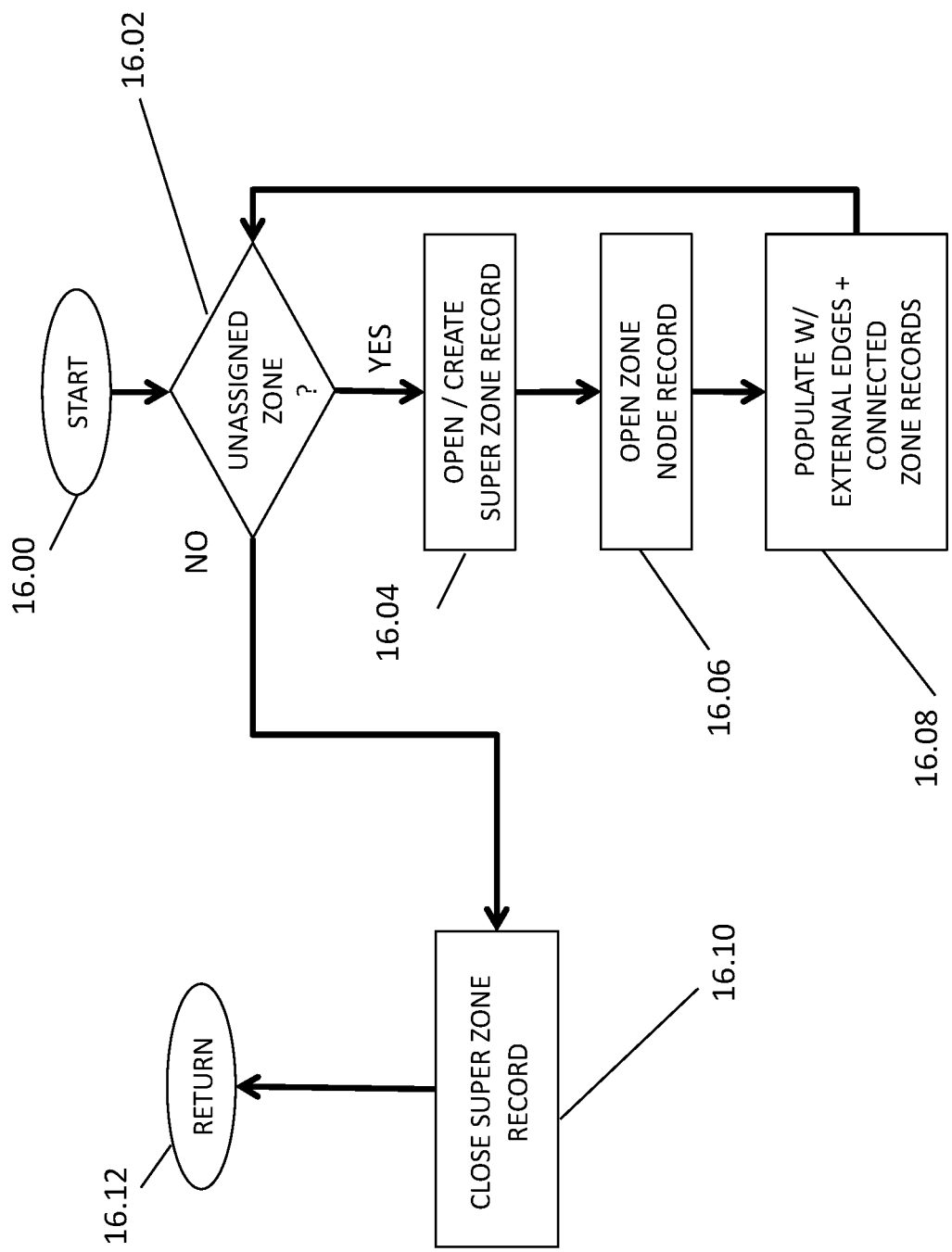
FIG. 16C is a flowchart of a process of generating the exemplary first superzone record of FIG. 16B.

FIG. 16C is a flowchart of a process of generating an exemplary first superzone record SZ.REC.01 wherein a plurality of connected zones A-F are associated to form the first superzone SZ.01. In step 16.02 the system 100 determines if a zone A-H exists that has not been assigned to a superzone record SZ.REC01-SZ.REC.N. In step 16.04 a superzone record SZ.REC is opened or created and in step 16.04 the zone record Z.REC of the zone A-H selected in step 16.02 is opened and examined. The superzone record SZ.REC of step 16.04 is then populated in step 16.08 with the external edges and connected zone identifications of the zone record Z.REC.01-Z.REC.N opened in step 16.06. The system 100 cycles through steps 16.02 through 16.08 until all connected zones A-F are referenced by the instant FIRST superzone record SZ.REC.01, and then closes the then fully updated FIRST superzone record SZ.REC.01 in step 16.10 and proceeds on to alternate computational operations.

It is understood that, in certain yet alternate preferred embodiments of the invented method, a superzone SZ.01-SZ.N may be defined as a collection of nodes N01-N61 of a same node type N.TYPE.01-N.TYPE.61 that are selected from a plurality of zones A-H.

Figure 16D:
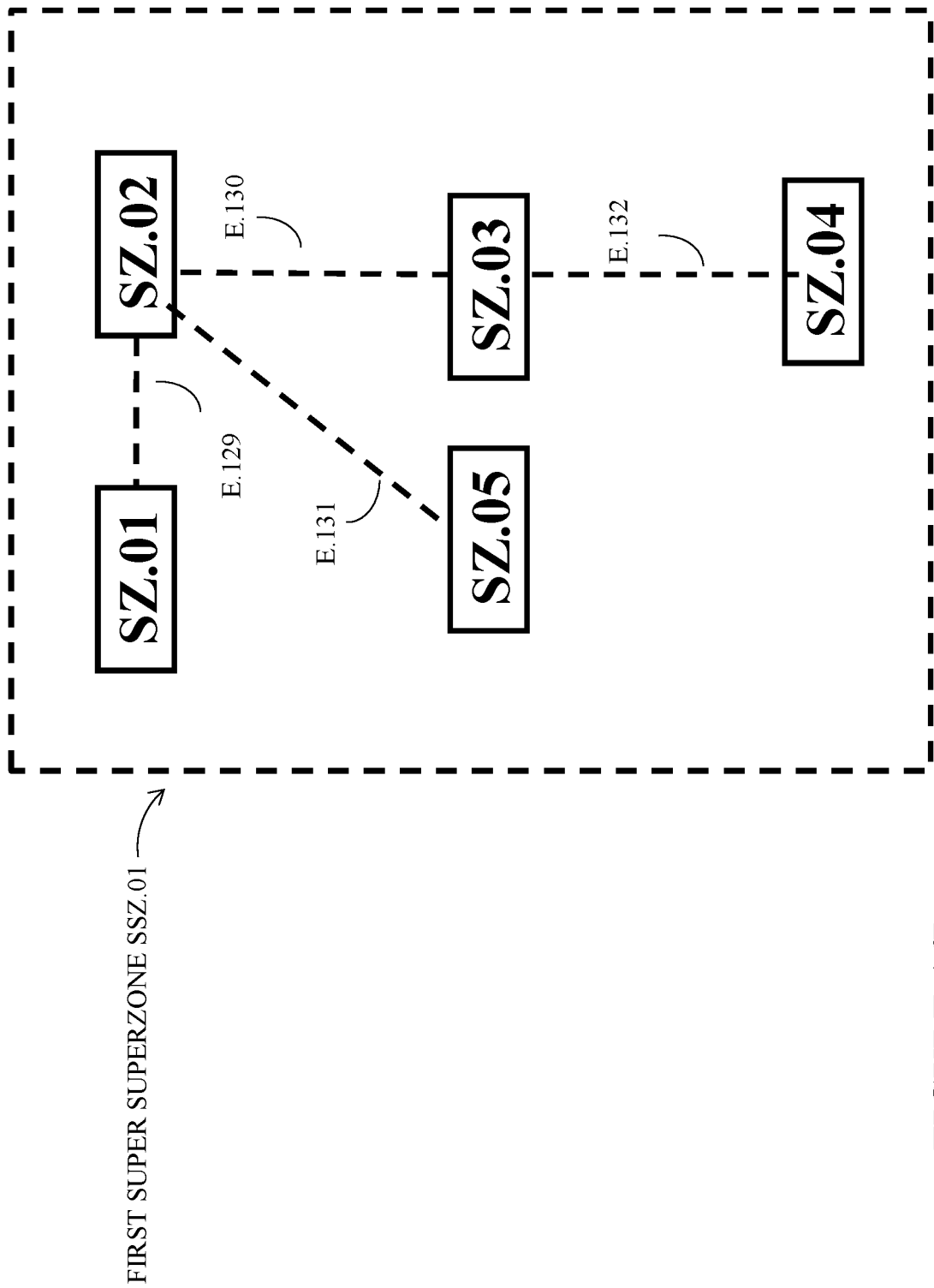
FIG. 16D is a visual representation of an exemplary first super superzone that comprises a plurality of superzones.

FIG. 16D is a visual representation of an exemplary first super superzone SZ.01 that comprises a plurality of super-zones SZ.01-SZ.05 connected additional external cross-links E.129-E.132. It is understood that in certain alternate preferred embodiments of the invented method that the identification of any two nodes N01-N43 as being comprised within a same super superzone SSZ.01 implicitly attests that a pathway of edges exists between the two included nodes N01-N43 of the comprising super superzone SSZ.01. It is understood that each of a plurality of super superzone records SSZ.REC.01-SSZ.REC.N each define distinguishable super superzones SSZ.1 that enable the DBMS to process at least one zone A-I as though it were merely a node with external edges in a first determination of the existence or non-existence of a pathway from a start node N01-N57 and an end node N01-N57 of a search query.

It is understood that the invented method allows the representation of a multiplicity of nodes N01-N57, zones A-J, superzones SZ.01-SZ.N and super superzones SSZ.01 defined or described by node records NR.01-NR.N, zone records Z.REC.01-Z.REC.N, superzone records SZ.REC.01-SZ.REC.N and/or superzone records SSZ.REC.01-SSZ.REC.N as a single node.

FIG. 16E is a block diagram of an exemplary first super superzone record SSZ.REC.01 that defines a first superzone SSZ.01 that comprises a plurality of super zones SZ.01-SZ.06. The first super superzone record SSZ.REC.01 includes (a.) a first super superzone record identifier SSZ.REC.ID.01 that uniquely defines the first super superzone record SZ.REC.01 to the system 100; (b.) a first super superzone identifier SSZ.ID.01 that uniquely defines the first super superzone SZ.01 to the system 100; and (c.) a plurality of superzone records SZ.REC.01-SZ.REC.06 that separately each define a unique super zone that are comprised within the exemplary first super superzone SSZ.01.

It is understood that as node records NR.01-NR.N as added, deleted and modified in and by the DBMS 218 that zones A-I are preferably updated and modified by deletion, addition, splitting and merging.

Figure 17A:
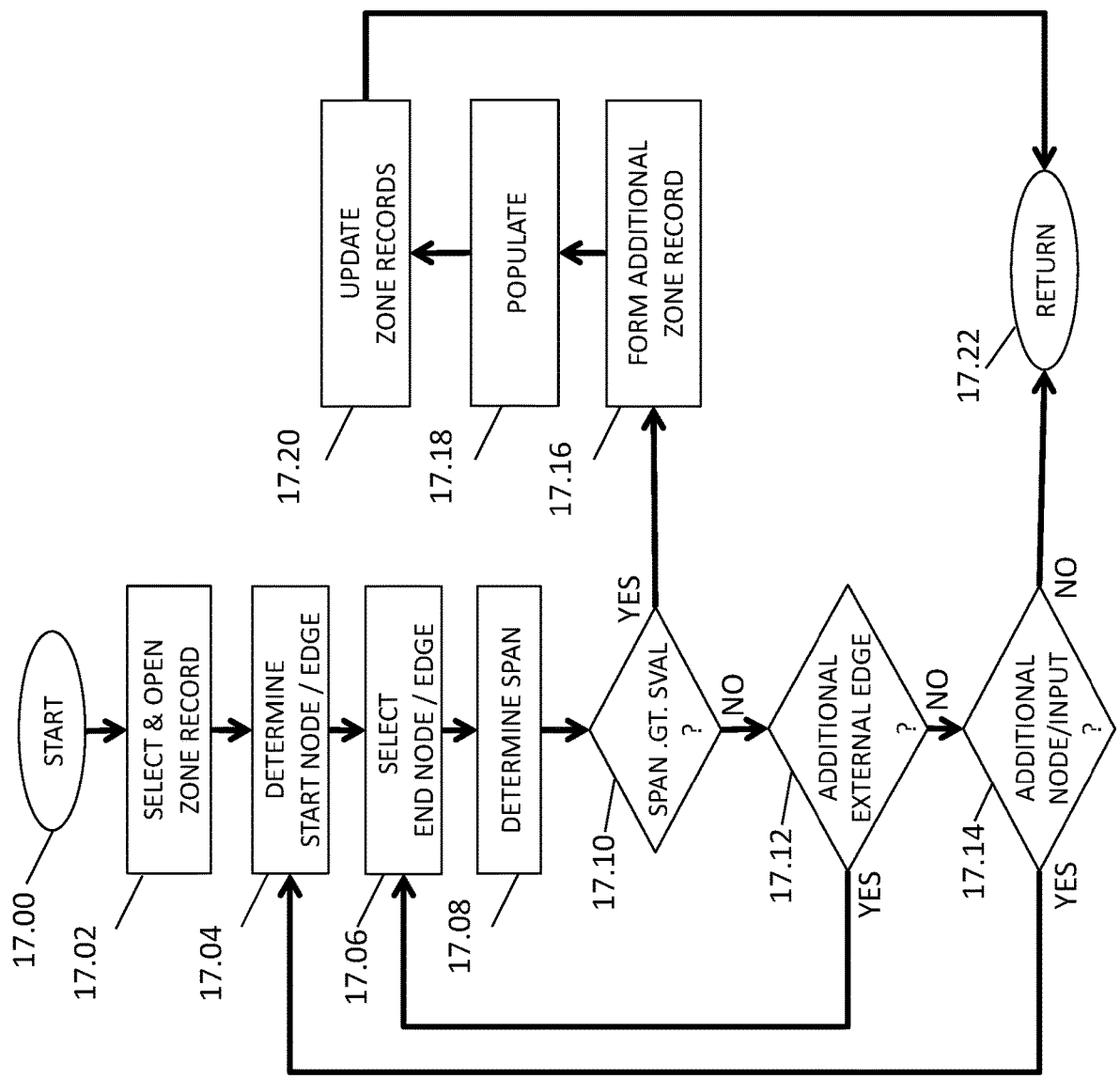
FIG. 17A is a flowchart of a splitting of an existing zone record into two zone records on the basis of the existing zone presenting an internal span between two border nodes that is greater that a limiting span parameter value.

Referring now to generally to the Figures and particularly FIG. 17A, FIG. 17A is a flowchart of a splitting of an existing zone A-H into two records Z.REC.08-Z.REC.09 on the basis of the existing zone A-H selected in step 17.02 presenting an internal span between two border nodes of the existing zone A-H being greater that a limiting span parameter value SVAL. Each border node is selected in separate executions of step 17.04 and the span between each border node is determined in executions of step 17.08 and the loop of step 17.04 through 17.14. When any two border nodes N01-N61 of the instant zone record Z.REC.01-Z.REC.N are determined to have a span greater than the limiting span parameter value SVAL, the system 100 proceeds from step 17.10 to step 17.16 to split the zone A-H selected in step 17.02 by forming a new zone record Z.REC.09 and populating the new ninth zone record Z.REC.09 in step 17.18. The content and references of the other existing zone records Z.REC.01-Z.REC.08 are then updated in step 17.20 to reflect the border records of the new ninth zone record Z.REC.09 and the changes of node removal from the zone A-H selected in step 17.02.

Figure 17B:
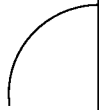
FIG. 17B is a block diagram of a ninth zone record of FIG. 3 that is generated by splitting the eighth zone of FIG. 9.

Referring now to FIG. 17B, FIG. 17B is a block diagram of a ninth zone record Z.REC.09 of a zone I that is formed by splitting the eighth zone H by deletion of certain nodes N53, N54 & N57 and optionally edges E.124 & E.125 from the eighth zone record Z.REC.08. The ninth zone record ZR.09 includes references to each node N53, N54 & N57 and/or each node record NR.53, NR.54 & NR.57 of the newly formed ninth zone I of FIG. 9 and FIG. 17B. The exemplary ninth zone record Z.REC.09 includes a ninth zone record identifier ZR.ID.09 that uniquely identifies the ninth zone record Z.REC.09 to the DBMS 218; a ninth zone identifier Z.ID.09 that uniquely identifies the ninth zone I to the DBMS 218; a plurality of node records identifiers NR.ID.53, NR.ID.54 & NR.57 and/or node identifiers N;ID.53, N.ID.54 & N.ID.57 of nodes that are comprised within the ninth zone I; and optionally references to internal edges E.124 & E.125 and/or external edges E.123 & E.127 and associated edge types E.TYPE.123-E.TYPE.124 & E.TYPE127. It is understood that each reference or inclusion of a node N53, N54 & N57 and node record NR.53, NR/54 & NR.57, internal edge E.124 & E.125, and internal edge record ER.124 & ER.125 of the ninth zone record Z.REC.09 is preferably deleted from the eighth zone record Z.REC, the eighth zone record Z.REC.08, the eighth zone connectivity record ZC.08, whereby the eighth zone is diminished in node count, edge count and span. Furthermore, the eighth zone record Z.REC.08, the eighth zone connectivity record ZC.08 and the eighth zone pathway record ZP.08 are preferably amended by the DBMS 218 to denote edges E.123 & E.127 as external edges.

Referring now to generally to the Figures and particularly FIG. 18A, FIG. 18A is a flowchart of a merging of two zone records Z.REC.01-Z.REC.N on the basis of the maximum span of any two nodes between two connected zones A-H being less than a span minimum value SVALM. In step 18.02 a zone record Z.REC.01-Z.REC.N is selected and in step 18.04 a zone record Z.REC.01-Z.REC.N connected to the zone record Z.REC.01-Z.REC.N selected in step 18.02 by an edge is next. The maximum span between any node of the first zone record Z.REC.01-Z.REC.N selected in step 18.02 and any node of a connected zone record Z.REC.01-Z.REC.N as selected in step 18.04 is determined in step 18.6.

The system 100 then compares the maximum span determined in step 18.06 with the span minimum value SVALM and proceeds on to step 18.10 to merge the first zone record Z.REC.01-Z.REC.N selected in step 18.02 with the connected zone record Z.REC.01-Z.REC.N as selected in step 18.04 when the maximum span determined in step 18.06 is less than the span minimum value SVALM. The system 100 proceeds from step 18.10 to step 18.12 to update the other remaining zone records Z.REC.01-Z.REC.N to reflect the zone record merger of step 18.10. The system 100 next determines in step 18.14 if there are any additional zone records Z.REC.02-Z.REC.09 available to examine for possible mergers, and proceeds back to step 18.02 when at least one more zone record Z.REC.02-Z.REC.N is available for merger consideration.

In the alternative, at step 18.08, when the system 100 determines that the maximum span determined in step 18.06 is not less than the span minimum value SVALM, the system 100 proceeds on to step 18.16 to determine if there is another zone record Z.REC.01-Z.REC.N that indicates a shared edge with the zone record Z.REC.01 selected in step 18.02, i.e., is connected with the zone record Z.REC.01 selected in step 18.02. The system 100 cycles through the loop of steps 18.04 through 18.08 and 18.16 until each zone record Z.REC.01-Z.REC.N sharing an edge with the zone record Z.REC.01 selected in step 18.02 is examined for merger. When each connected zone record Z.REC.01-Z.REC.N has been examined for merger, the system 100 proceeds from step 18.16 to step 18.18 and to perform additional computational operations.

Referring now to FIG. 18B, FIG. 18B is a block diagram of a tenth zone record ZR.10 that defines or describes a tenth zone J and that is formed by merging (a.) the fifth zone record ZR.05 that defines zone E of the first graph G.01 and (b.) the sixth zone record ZR.06 that defines the sixth zone F of the first graph G.01. The ninth zone record Z.REC.09 includes or references each and/or node N30-NR.40, N42 & N43 and/or each node record NR.30-NR.40, NR.42 & NR.43 that defines or describes a node N30-N40, N42 & N42 comprised within the newly formed tenth zone J of FIG. 10 as formed by merging the fifth zone E and the sixth zone F.

Figure 19:
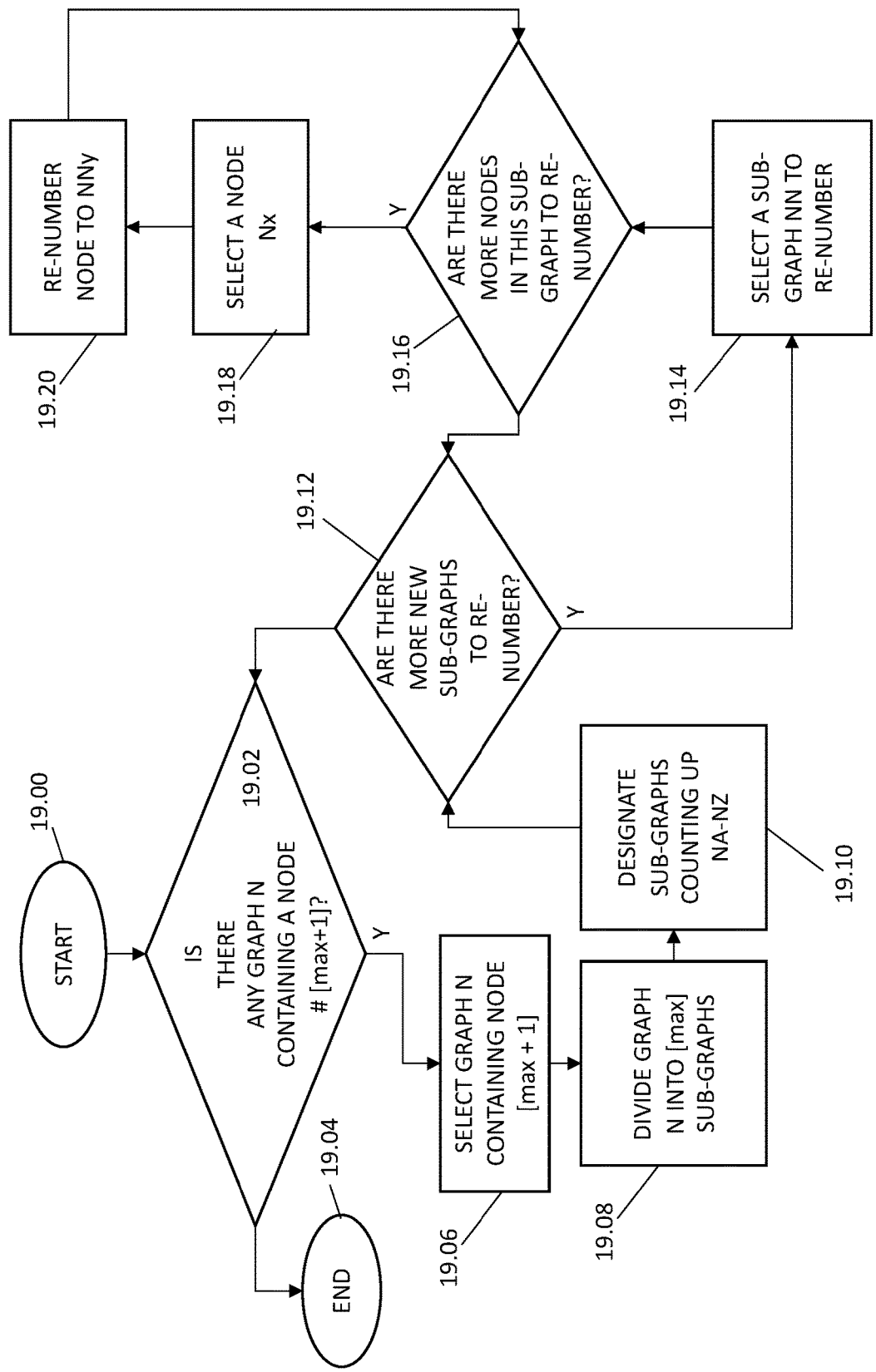
FIG. 19 is a process chart presenting an algorithm for subdividing graphs according to the invented method.

Referring now generally to the Figures and particularly to FIG. 19, FIG. 19 is a process chart for sub-dividing graphs in accordance with a preferred embodiment of the invented method, wherein designators comprising at least one dimensional value, and generally a plurality of dimensional values, are assigned to nodes. The assigned designators include dimensional values identifying layers of the graph and that further indicate membership of nodes within a zone(s) and/or subzones and/or node groupings. Designators generally include a pattern of dimensional values that each express a quality of a variate property of the associated node. The invented method optionally comprises generating selecting and interrogating at least some of unique designator, wherein most designators comprise an assigned pattern of dimensional values, optionally in accordance with the method of FIG. 19.

In step 19.00 the process begins. Step 19.02 controls a loop, such that if the condition is ever false the process ends at step 19.04. The intent of the algorithm is to subdivide the graph until all subgraphs consist of a defined X nodes or fewer. In the process chart, X is represented as [max], as in the maximum number of nodes a graph should contain. In many preferred embodiments, X=10, but this should not be construed as a limitation. In the example of FIGS. 20A through 20I, X=3, to allow a legible, scaled example within a reasonable image size. Therefore, the loop condition is: are there any graphs or subgraphs containing more than X nodes? If the nodes are numbered, then another way to ask the same question is: is there a node numbered X+1? For instance, if X=10, then a node #11 would indicate that there is still subdividing to be done regardless of how high the nodes may count past 11. If there is a node numbered X+1, then the graph to which that node belongs is selected in step 19.06. FIGS. 20B and 20E correspond to two separate iterations of performing steps 19.04 and 19.06 in the example of FIGS. 20A through 20I. There may be more than one graph or subgraph making the loop statement true; one at a time is selected and it doesn't really matter which one is selected first unless one is prioritized over another for some other reason.

In step 19.08, the selected graph is subdivided into X sub-graphs and the nodes of that selected graph distributed into those X sub-graphs. At this point, by definition, the selected graph no longer contains too many nodes; the selected graph now contains exactly X nodes, namely the X sub-graphs that the nodes of the selected graph just got bundled up into. Now, if any graph still has too many nodes, it'll be one of the sub-graphs instead. In step 19.10, the new sub-graphs are given their designations. In this method, graphs are lettered and nodes are numbered, and all items have as a prefix the designation of the graph to which they belong. Therefore, the first new sub-graph of any Graph N, where N is the letter designation of that graph, will be named NA, the second NB, the third NC, and so on. This rule applies for any level of nesting hierarchy; N is a variable representing any letter or string of letters used as a graph designation, such as A, DBB, or ACCBQ. Note that in a method where X equals 3, a new layer of sub-graphs is always NA, NB, and NC; in a method where X equals 10, the sub-graphs are NA, NB, NC, ND, NE, NF, NG, NH, NI, and NJ; and so on. If X is greater than 26, one might borrow from other alphabets or use pairs of letters to designate graphs instead of singles, much the same way one increases the data size to handle more potential values in any computing system.

Once the sub-graphs are created, the node designations are no longer accurate because the nodes are now within an additional layer. The next steps are to update the node designations to reflect their new nesting level. In step 19.14, a new sub-graph NN is selected to be re-numbered, with NN representing the letter designation of the new sub-graph (e.g. NA, NB, NC, ND and so on as mentioned above, where N is the letter designation of the parent graph). Step 19.16 controls a loop for iterating through each node. In step 19.18, a node within the sub-graph NN is selected for renumbering; prior to renumbering, the node is numbered based on belonging to the parent graph N, with a node designation in the format Nx, where N is the letter designation of the parent graph N and x is some numeral. In step 19.20, the node is re-numbered in the format NNy, where NN is the letter designation of the sub-graph NN to which the node now belongs (with the sub-graph itself belonging to the graph N), and y is some appropriate numeral, which may be the same node number as before but may not be. Consider the example of FIGS. 20A through 20I, particularly at FIGS. 20C and 20D. The nodes were previously numbered A1 through A23, as belonging to graph A, but once sub-graphs AA, AB, and AC are created and the nodes split up between them, nodes A1 through A4, A7, and A9 are redesignated AA1 through AA6; nodes A5, A6, A8, and A10-15 are redesignated AB1-AB9; and nodes A16 through A23 were redesignated AC1-8. Note in the example that, where previously the numerals counted up to 23, they now count no higher than 9; when there is no numeral higher than X (in the case of the example of FIGS. 20A-20I, X=3), the process will be complete. Once all of the nodes of a subgroup NN have been re-designated from Nx to NNy (e.g. A11 to AB5 in the center of the diagram of the example of FIGS. 20C and 20D), then the next subgroup is selected at steps 19.12 and 19.14, and the same is done to that next subgroup NN, until all of the nodes of all of the subgroups are re-designated.

Once this is done, the main loop at step 19.02 is re-started; is there currently any graph (sub-graphs included) that contains more than X items (either sub-graphs or nodes)? If so, that graph is split up next, and this continues until all graphs contain X items or fewer; at which point the process ends at step 19.04.

As an additional means of explanation, one might consider a file folder hierarchy on one's computer, which is a similar structure. Suppose that one began with a directory containing a bunch of files, and wanted to organize the files such that no folder or directory contained more than X number of items. One begins by creating X new folders, and relocating all of the files in the directory except those X folders, into one of those X folders. Then one opens one of the X sub-folders. Are there more than X items in that folder? Make X more folders, distribute again. And so on. If one then opens Windows Explorer, MacOS Finder, Linux Folders, or uses a "pwd" command in a terminal window, the full file path, with the folder levels separated by slashes, might be considered analogous to the string of letters designating graphs, with each layer part of the filename, and files distinguishable from folders by the ending, where files end in a file extension (*.txt, *.doc, *.xls, *.exe, and so on) and the folders don't. Incidentally, while from a user's perspective files are being picked up and relocated from one location to another, a computer file system makes no distinction between the action of moving a file and that of renaming a file; the filename is the location, similar to the node and graph designation hierarchy of the present invented method. This should be considered only a potentially helpful explanatory analogy, rather than suggesting any limitation, conceptual or otherwise.

Referring now to the Figures and particularly to FIGS. 20A through 20I, FIGS. 20A through 20I are a step-by-step example of a group A of nodes A1 through A23 being subdivided and renumbered in accordance with the algorithm of the flowchart of FIG. 19. It is understood that this is a simplified example included only for the purposes of explanation. While the invented method pertains to graphs of interconnected nodes, the nodes of this examples are not interconnected (or at least, connections are not depicted), so one might view this as the same method applied to a simpler task of grouping and sub-grouping of nodes. In this example, the X or [max] constant as explicated in FIG. 19 is equal to 3; therefore, each time the groups are subdivided, it will be into three subgroups, and each group will end up with no more than 3 items.

Figure 20A:
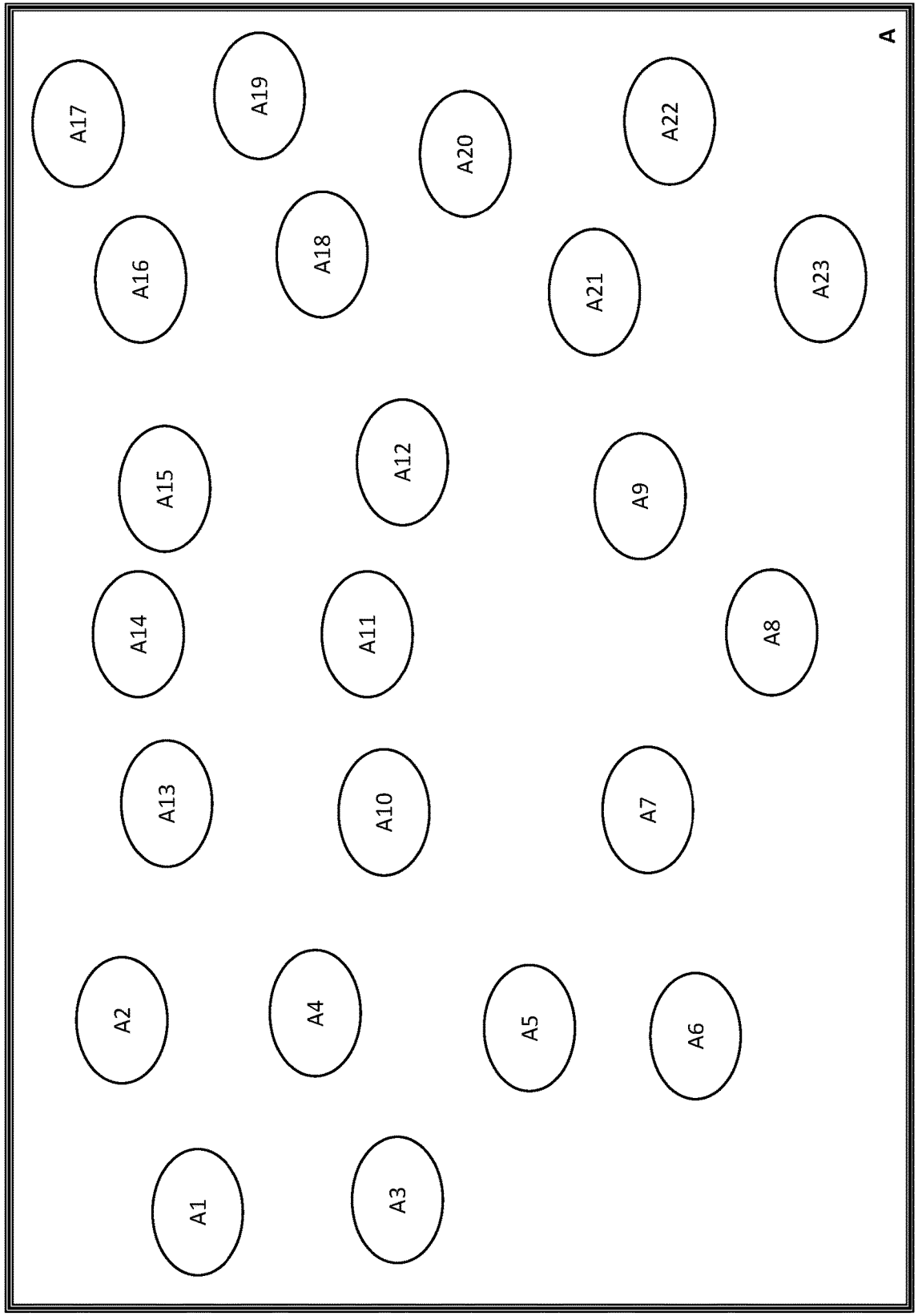
FIG. 20A is a first diagram in a sequence of diagrams presenting an example applying the method of FIG. 19.
Figure 20B:
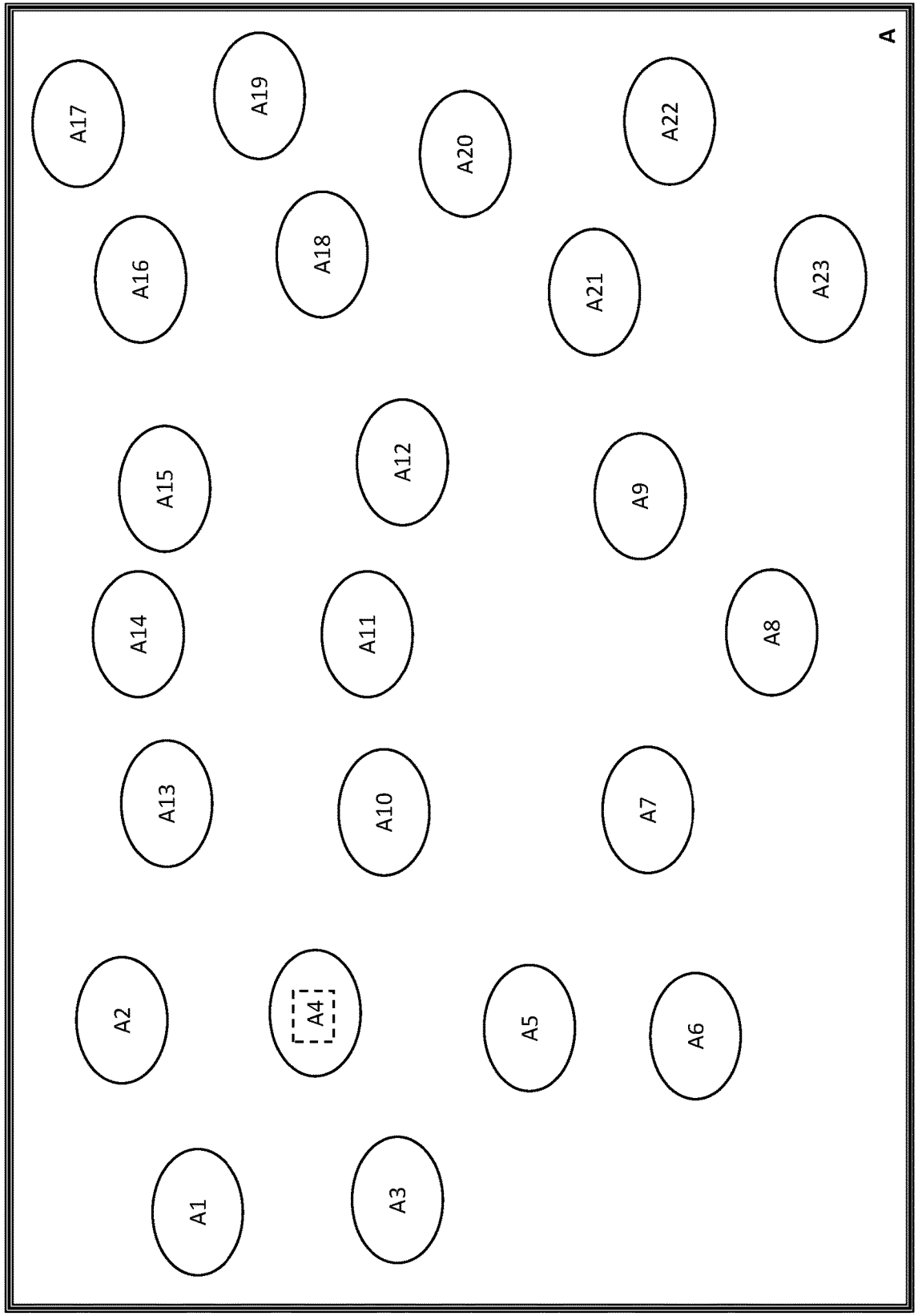
FIG. 20B is a second diagram in a sequence of diagrams presenting an example applying the method of FIG. 19.

FIG. 20A introduces a single group A containing 23 nodes numbered A1 through A23.

FIG. 20B corresponds to step 19.04, in which the subdividing continues if there is any group that contains more than X (i.e. 3) items. There exists an item numbered A4 (X+1); therefore Group A contains more than 3 items and therefore should be subdivided according to the present method.

Figure 20C:
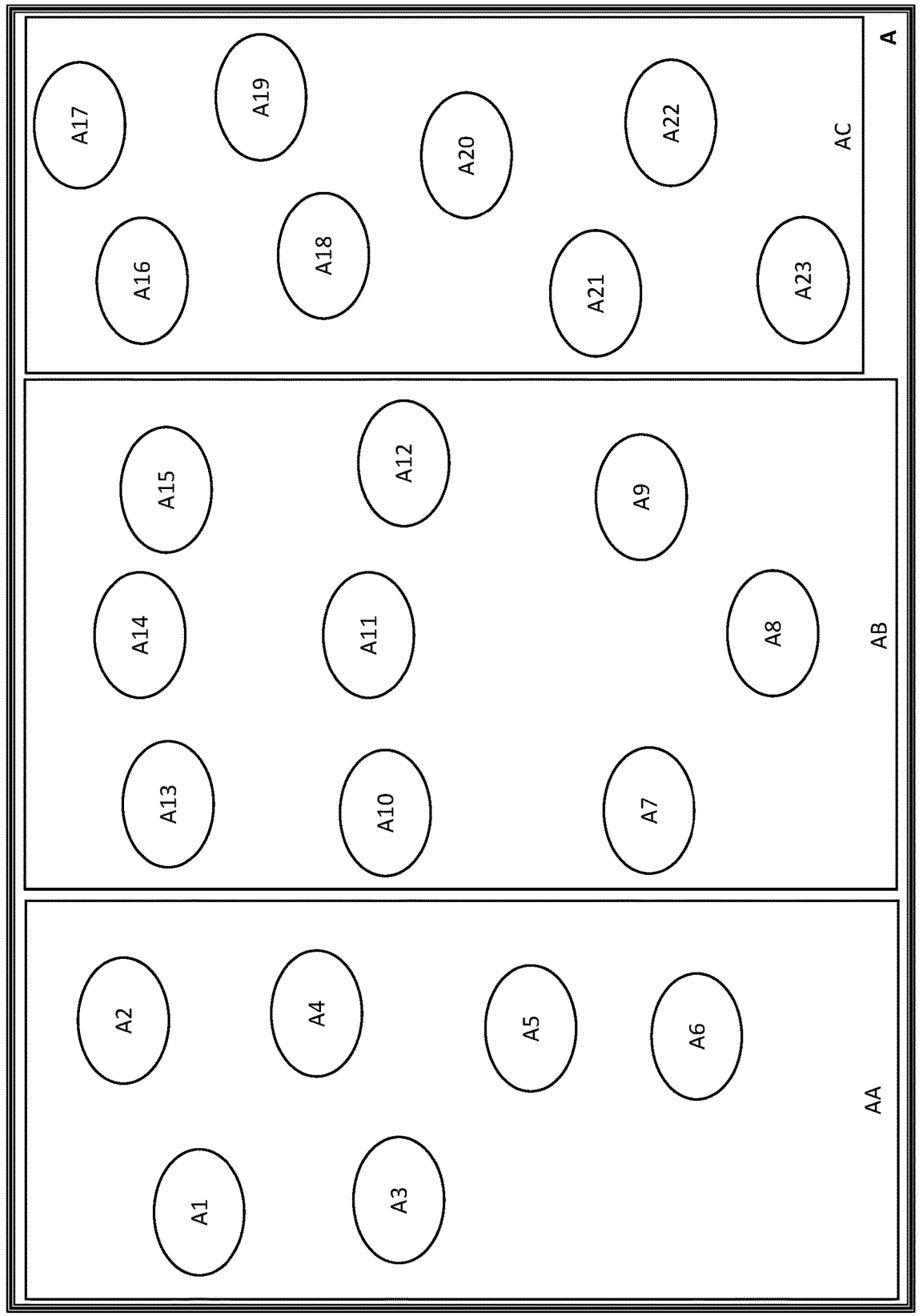
FIG. 20C is a third diagram in a sequence of diagrams presenting an example applying the method of FIG. 19.

FIG. 20C continues the process by subdividing Group A into X subgroups, in this case 3. The subgroups are designated with their parent group's designation (A) as a prefix; therefore, they are AA (Group A, Subgroup B), AB (Group A, Subgroup B), and AC (Group A, Subgroup C). Note that Group A no longer contains 23 items; now, by definition, Group A contains only 3 items, the 3 subgroups, and the 'too many items problem' has been pushed onto the subgroups instead. Note that Group A will never need subdividing again; its number of items has been set at 3 by the creation of the 3 subgroups. Note also that the contents of Group A need not be evenly or carefully divided between groups AA, AB, and AC; doing so may provide the benefit of fewer nested layers of graph, if this is preferred. Extreme distributions, such as keeping the 23 nodes together in one subgraph and leaving the other two subgraphs empty, would not be preferred, as this would simply make the graph one layer deeper without actually subdividing anything; the loop of step 19.02 would end up running infinitely. Short of that, though, one need not evenly divide the nodes to 'get there eventually'.

Figure 20D:
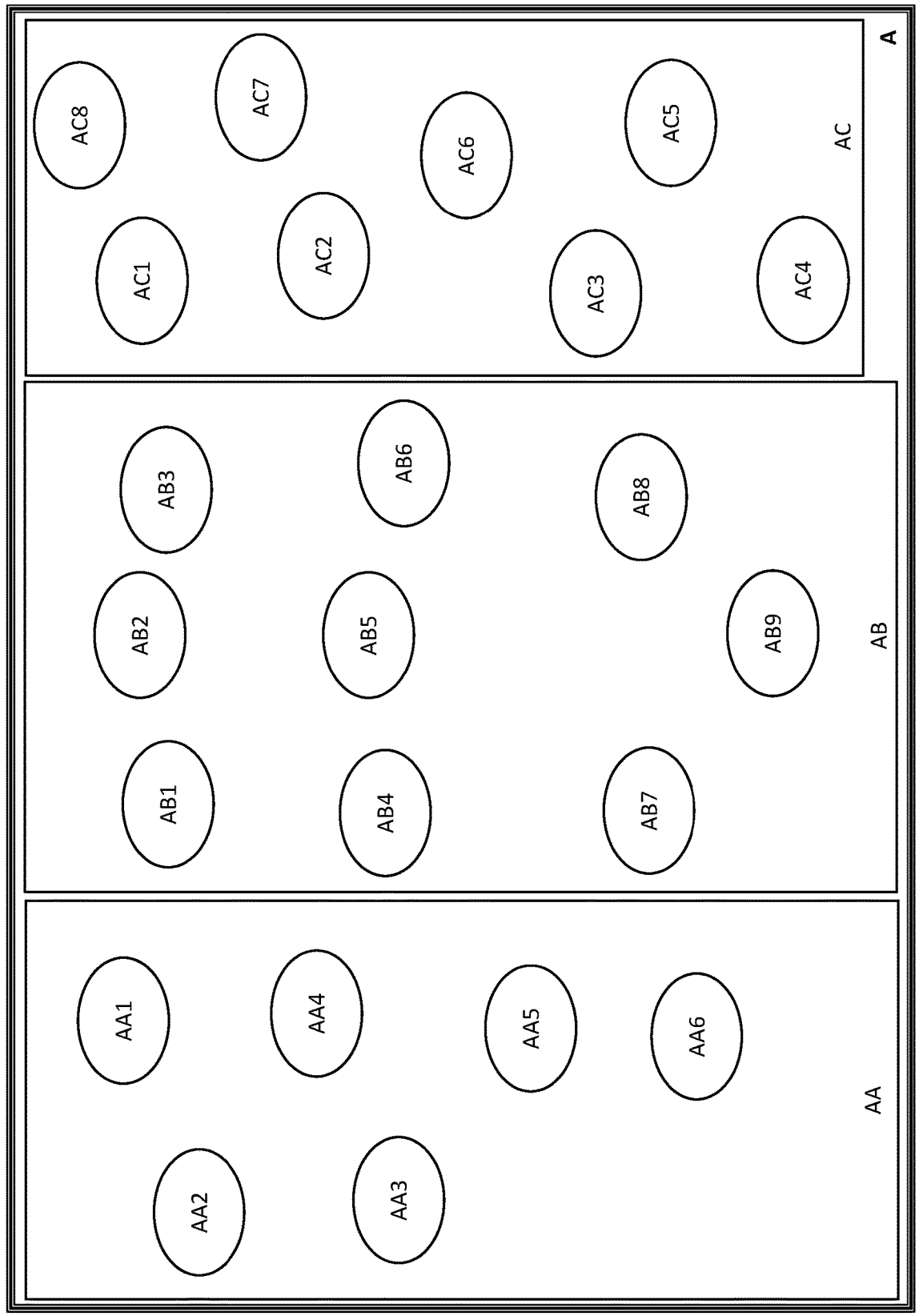
FIG. 20D is a fourth diagram in a sequence of diagrams presenting an example applying the method of FIG. 19.
Figure 20E:
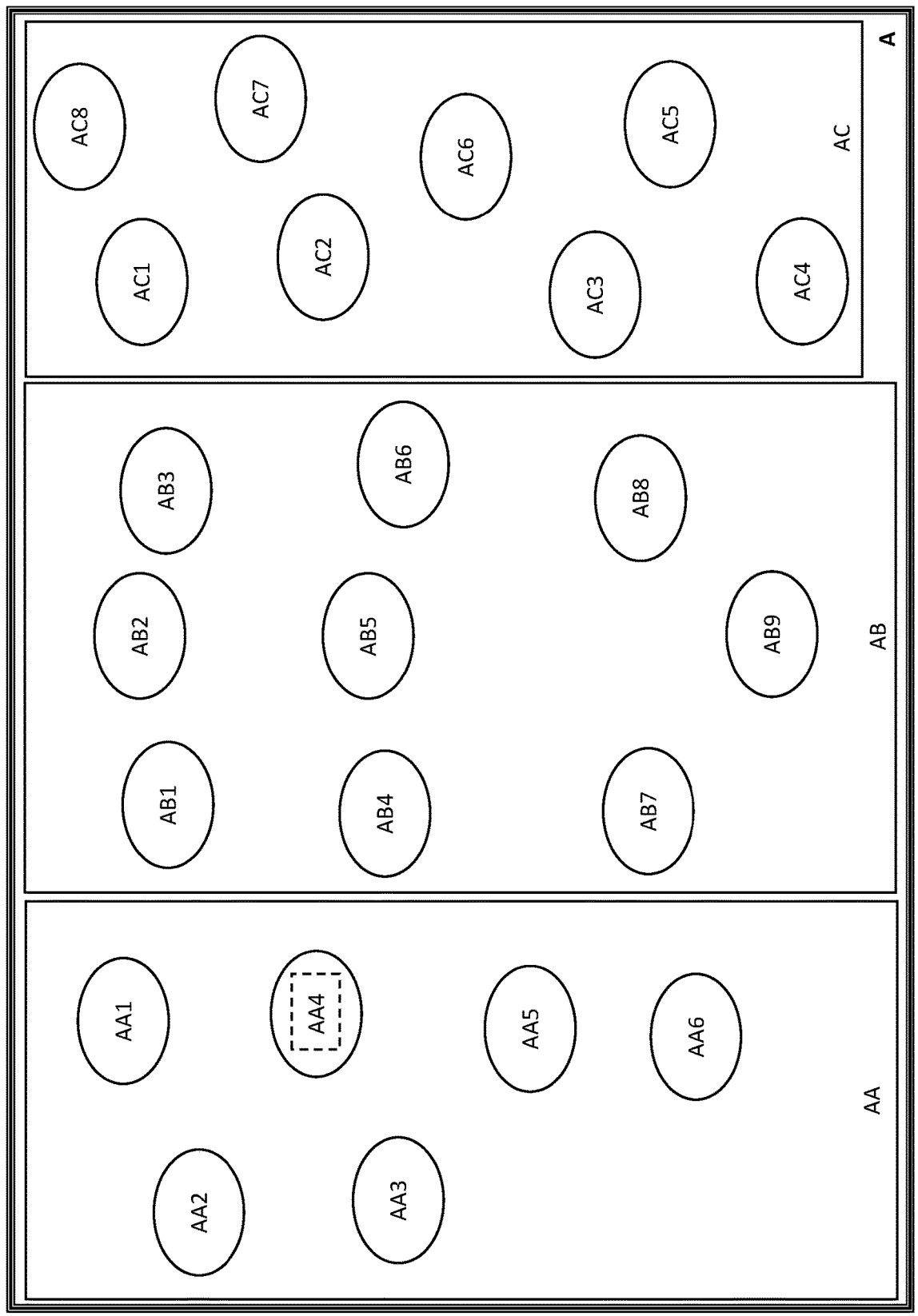
FIG. 20E is a fifth diagram in a sequence of diagrams presenting an example applying the method of FIG. 19.
Figure 20F:
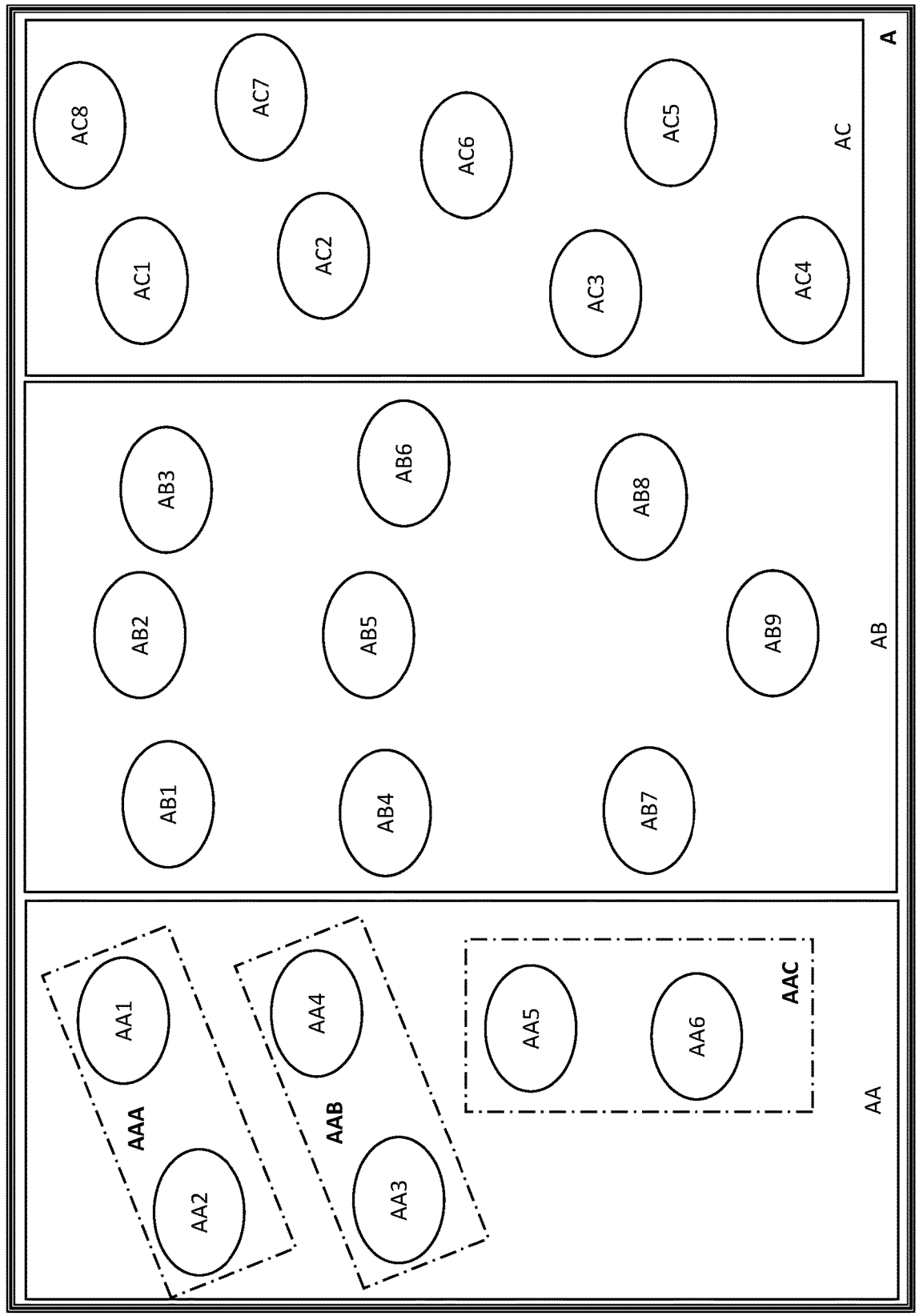
FIG. 20F is a sixth diagram in a sequence of diagrams presenting an example applying the method of FIG. 19.

FIG. 20D continues the example by re-labeling and re-numbering the node designators to reflect the subgroups to which these nodes now belong. The nodes of group AA are now numbered AA1 through AA6, the nodes of group AB are now numbered AB1 through AB9, and the nodes of group AC are numbered AC1 through AC8. Note that the nomenclature of groups and nodes indicates where each item fits into the hierarchy; a designation ending in a numeral is a node, and the string of letters preceding indicates all of the layers of grouping hierarchy within which that node is nested.

FIG. 20E continues the example. Now that the nodes are re-numbered according to their new groups, the first round of subdivision is over. The question of step 19.02 of FIG. 19 is asked again: does there exist any group containing more than 3 items (i.e. with a node number of 4 or higher)? There are three, and any of them might be selected as the next 'target group', so group AA is arbitrarily selected for this iteration. Whenever a group is subdivided into subgroups, X subgroups are made, regardless of how many items there are to distribute among them; this saves on analysis by simultaneously guaranteeing that each group is only subdivided once and negating a necessity otherwise to count items and figure out how many groups should be made. One might consider this a 'top-down' approach to subdividing, as opposed to a bottom-up approach of parceling the individual nodes up into bundles of no more than 3, then grouping the bundles, then grouping the bundles, however many layers deep. Therefore, even though it's easy to see that the 6 nodes of group AA can be divided into 3 and 3, the algorithm makes three subgroups instead: AAA, AAB, and AAC. Notice how the subgroup designations continue to indicate the entire layered hierarchy in which the subgroup is nested.

Figure 20G:
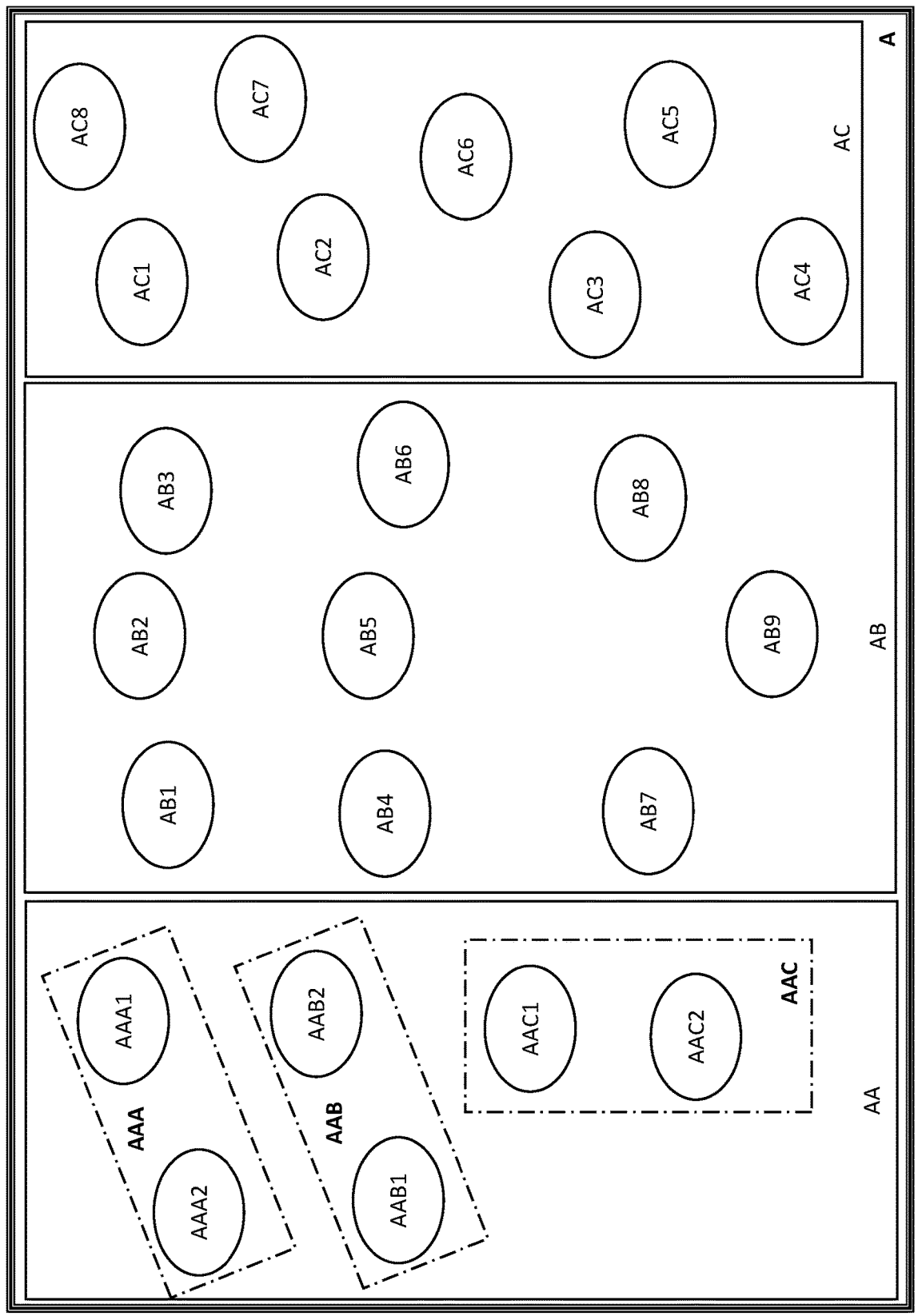
FIG. 20G is a seventh diagram in a sequence of diagrams presenting an example applying the method of FIG. 19.

FIG. 20G continues the example. Now that the subgroups AAA, AAB, and AAC have been created, the constituent nodes of these subgroups are renumbered. The two nodes of group AAA become AAA1 and AAA2; the two nodes of group AAB become AAB1 and AAB2; and the two nodes of group AAC become AAC1 and AAC2.

Figure 20H:
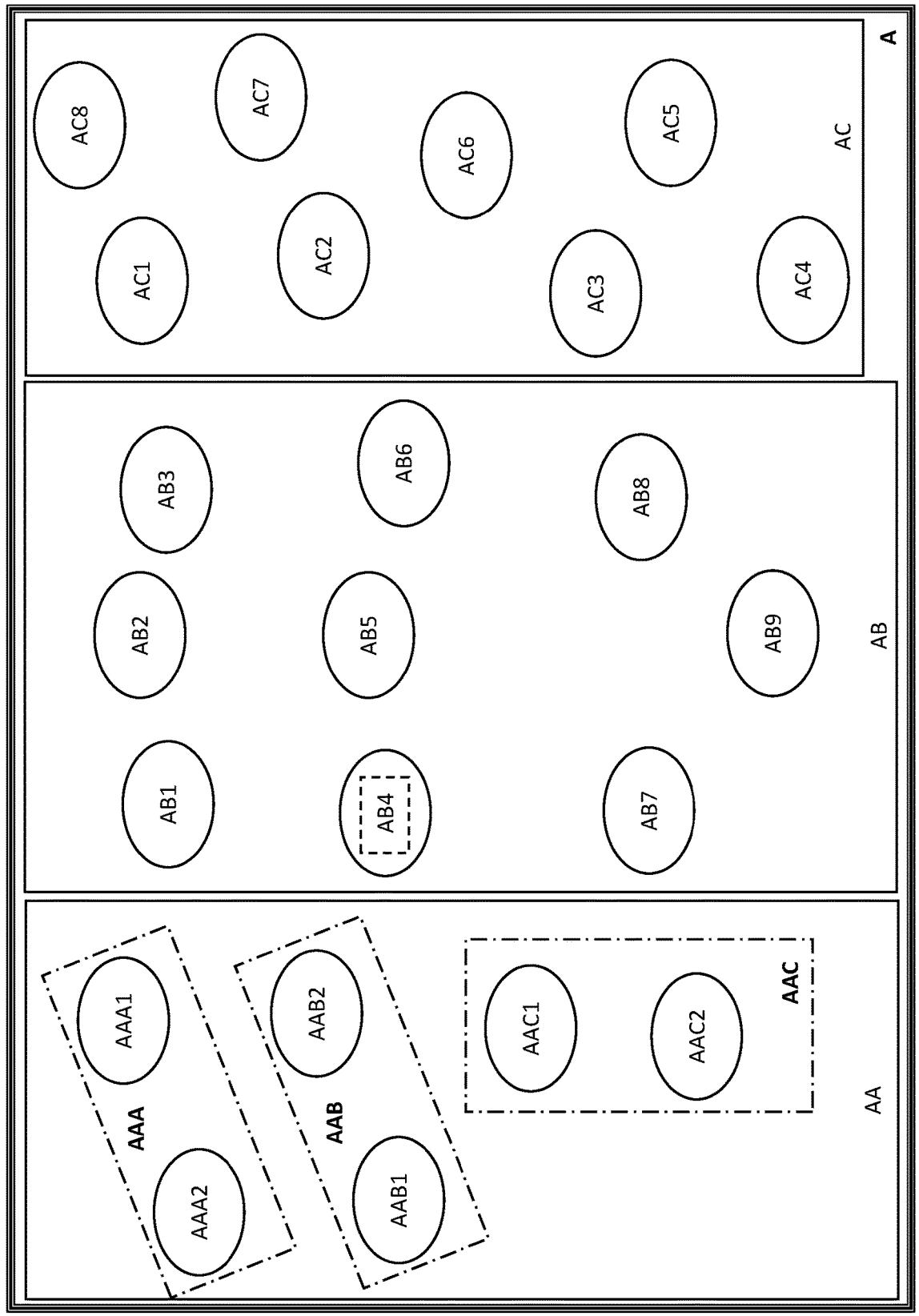
FIG. 20H is an eighth diagram in a sequence of diagrams presenting an example applying the method of FIG. 19.

FIG. 20H continues the example by presenting the beginning of the next loop iteration; group AB is the next group selected, as AB4 is a node number counting higher than 3.

Figure 20I:
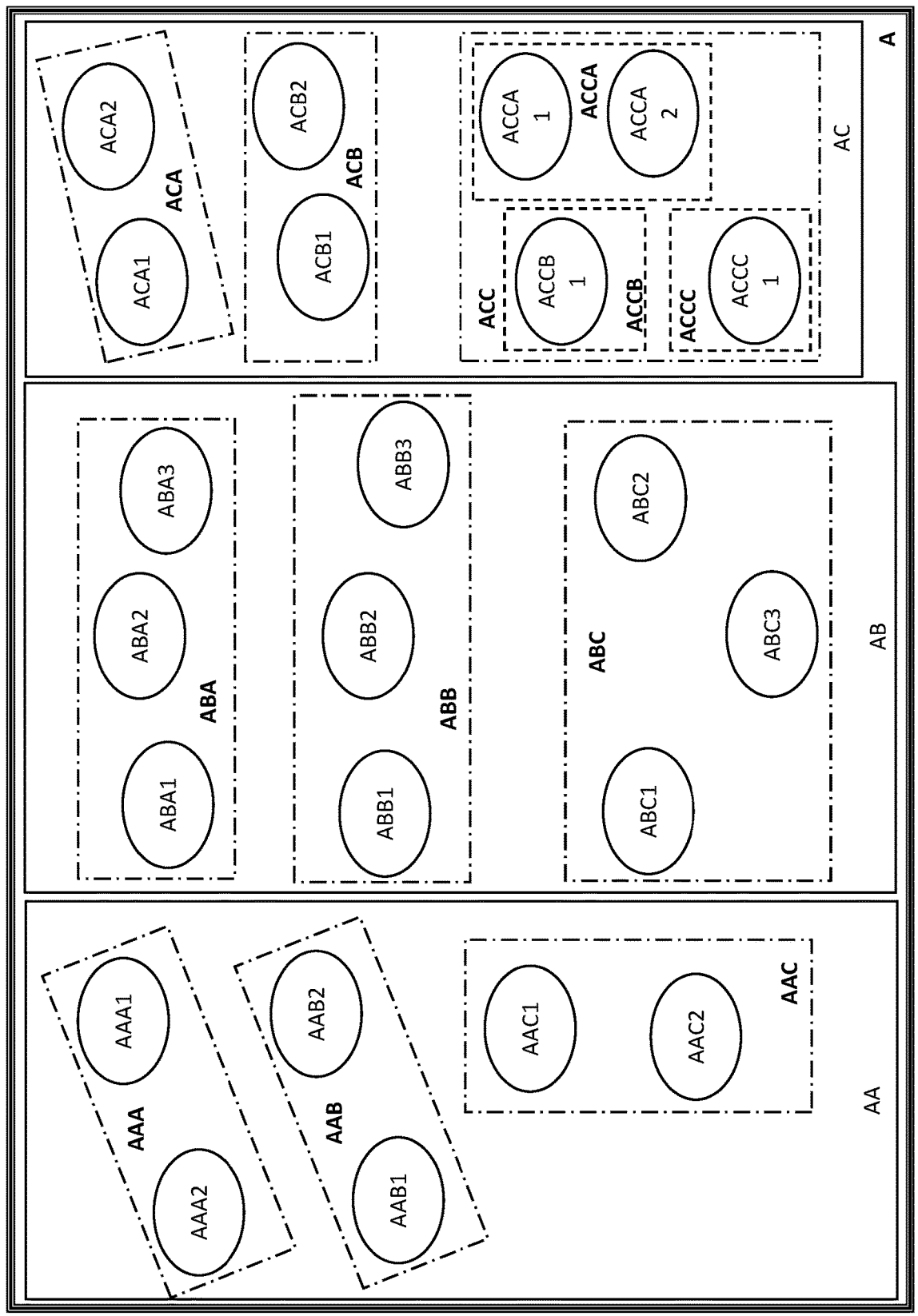
FIG. 20I is a ninth diagram in a sequence of diagrams presenting an example applying the method of FIG. 19.

FIG. 20I is the final Figure of the example of FIGS. 20A through 20I, presenting the subdivided example a few more similar loop iterations after FIG. 20H. Group AB has been subdivided into group ABA containing nodes ABA1, ABA2, and ABA3; group ABB containing nodes ABB1, ABB2, and ABB3; and group ABC containing nodes ABC1, ABC2, and ABC3. Group AC has been subdivided into group ACA containing nodes ACA1 and ACA2; group ACB containing nodes ACB1 and ACB2; and group ACC, which further contains group ACCA containing nodes ACCA1 and ACCA2; group ACCB containing node ACCB1; and group ACCC containing node ACCC1. Note how, in this example, when group AC was subdivided group ACC ended up with four items, requiring a further subdivision of group ACC. This could have been avoided with a more even distribution of nodes between groups ACA, ACB, and ACC, but this was unnecessary unless optimizing for a shallow hierarchy; the algorithm dealt with the imbalance just fine by simply creating one more level.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. In a graph database management system, a computer-implemented method of searching for islands of nodes comprising:

a. Selecting a multiplicity of nodes;

b. Deriving a designator for each node of the multiplicity of nodes and associating each designator in a one-to-one correspondence with a respective node from which a respective designator is derived;

c. Each designator indicating a plurality of dimensional values, and each dimensional value expressing a quality of a variate property of an associated node;

d. Selecting a unique designator having a particular pattern of dimensional values;

e. Selecting a first node having a first node designator matching the particular pattern of dimensional values;

f. Determining if the first selected node is connected to any node not having a designator expressing the particular pattern of dimensional values ("an external node") by an edge;

g. When an edge connecting the first selected node with an external node is found, halting the search process and processing the search as yielding a negative finding;

h. Repeating steps e through g on each node having a designator expressing the particular pattern of dimensional values, until either a first instance of a negative finding is determined in an execution of step h, or no nodes having the particular pattern of dimensional values expressed in the respective designator of the instant node are connected by an edge to an external node; and j. when no node having the particular pattern of dimensional values expressed in the respective designator of the instant node is found to be connected by an edge to an external node, reporting a positive finding of an island, wherein a positive finding of an island indicates a detection of an instant subgraph of the graph all nodes included in the instant subgraph are connected only to other nodes in the instant subgraph, wherein a positive finding of an island indicates a detection of an instant subgraph of the graph all nodes included in the instant subgraph are connected only to other nodes included within the instant subgraph.

2. The computer-implemented method of claim 1, wherein the edge is defined as a communications modality.

3. The computer-implemented method of claim 1, wherein the edge is defined as an edge type.

4. The computer-implemented method of claim 3, wherein the edge type is defined as a communications modality.

5. The computer-implemented method of claim 3, wherein the edge type identifies a type of transaction.

6. The computer-implemented method of claim 5, wherein the edge type identifies a type of transaction with an external node expressing a second particular plurality of dimensional values in its associated designator.

7. The computer-implemented method of claim 3, wherein the edge type identifies a range of time-date values.

8. The computer-implemented method of claim 3, wherein the edge type identifies a time length value.

9. The computer-implemented method of claim 3, wherein the edge type identifies at least two aspects of the edge.

10. The computer-implemented method of claim 1, wherein at least one dimension is a geographic designation.

11. The computer-implemented method of claim 1, wherein at least one node is associated with a group identity.

12. The computer-implemented method of claim 1, wherein at least one node is associated with a personal identity.

13. The computer-implemented method of claim 1, wherein at least one-dimensional values indicates inclusion within a superzone of a graph database.

14. The computer-implemented method of claim 1, wherein at least one-dimensional values indicates inclusion within a zone of a graph database.

15. The computer-implemented method of claim 1, wherein at least one-dimensional value indicates inclusion within a layer of a graph database.

16. The computer-implemented method of claim 1, wherein at least one-dimensional values indicate an exclusion from at least one zone of a graph database.

17. The computer-implemented method of claim 1, wherein the graph database management system includes at least one software object.

18. The computer-implemented method of claim 17, wherein the graph database management at least one software object includes information describing at least one node.

19. The computer-implemented method of claim 17, wherein the at least one software object includes information defining the edge.

20. An information technology system comprising at least one computer having a processer coupled with a memory and adapted to direct a graph database management software, the memory enabled to access and apply instructions that operatively direct the information technology system to:
   a. Select a multiplicity of nodes from a database;
   b. Derive a designator for each node of the multiplicity of nodes and associating each designator in a one-to-one correspondence with a respective node from which a respective designator is derived, each designator indicating a plurality of dimensional values, and each dimensional value expressing a quality of a variate property of an associated node;
   c. Select a unique designator having a particular pattern of dimensional values;
   d. Select a first node having a first node designator matching the particular pattern of dimensional values;
   e. Determine if the first selected node is connected any node not having a designator expressing the particular pattern of dimensional values ("an external node") by an edge, and when an edge connecting the first selected node with an external node is found, halting the search process and processing the search as yielding a negative finding; and
   f. Repeat steps d and e on each node having a designator expressing the particular pattern of dimensional values, until either a first instance of a negative finding is determined in an execution of step e, or no nodes having the particular pattern of dimensional values expressed in the respective designator of the instant node are connected by an edge to an external node, and when no examined node having the particular pattern of dimensional values expressed in the respective designator of the instant node is found to be connected by an edge to an external node, reporting a positive finding of an island, wherein a positive finding of an island indicates a detection of an instant subgraph of the graph all nodes included in the instant subgraph are connected only to other nodes included within the instant subgraph.

* * * * *